United States Patent [19]

Sasai et al.

[11] Patent Number: 5,017,945
[45] Date of Patent: May 21, 1991

[54] METHOD OF AN APPARATUS FOR RECORDING IMAGES, WHILE AVOIDING DAMAGE DUE TO PROLONGED CONTACT BETWEEN PLATEN AND RECORDING DEVICE

[75] Inventors: Keizo Sasai, Yokohama; Kenkichi Sakuragi, Tokyo; Mitsunori Nakamura, Kawasaki; Akio Ohkubo, Tokyo; Motoaki Yoshino, Kawasaki, all of Japan

[73] Assignee: Canon Kabushiki Kaisha, Tokyo, Japan

[21] Appl. No.: 524,672

[22] Filed: May 16, 1990

Related U.S. Application Data

[63] Continuation of Ser. No. 434,550, Nov. 13, 1989, abandoned, which is a continuation of Ser. No. 94,902, Sep. 10, 1987, abandoned.

[30] Foreign Application Priority Data

Sep. 11, 1986 [JP] Japan ................... 61-212797
Oct. 27, 1986 [JP] Japan ................... 61-253779
Jul. 8, 1987 [JP] Japan ................... 62-170455
Jul. 9, 1987 [JP] Japan ................... 62-169714

[51] Int. Cl.$^5$ ........................... G01D 15/24
[52] U.S. Cl. ................ 346/136; 346/76 PH; 358/296
[58] Field of Search ............ 346/136, 24, 76 PH; 358/296, 298; 400/584, 605, 607, 608.3, 609

[56] References Cited

U.S. PATENT DOCUMENTS 4,613,907 9/1986 Yoshimoto et al. ............ 358/257
4,868,674 9/1989 Nakamura et al. ............ 346/136

FOREIGN PATENT DOCUMENTS 0081362 6/1983 European Pat. Off. .
0240878 10/1987 European Pat. Off. ....... 355/14 SH
44-12210 6/1969 Japan .
50-7928 3/1975 Japan .
58-072486 4/1983 Japan .
58-185283 10/1983 Japan .
59-40759 3/1984 Japan .
59-124879 7/1984 Japan .
0136275 8/1984 Japan ........................ 400/605
60-068768 4/1985 Japan .
0229467 11/1985 Japan ........................ 358/304
60-193746 12/1985 Japan .

*Primary Examiner*—Benjamin R. Fuller
*Assistant Examiner*—Huan Tran
*Attorney, Agent, or Firm*—Fitzpatrick, Cella, Harper & Scinto

[57] ABSTRACT

A method of and an apparatus for recording an image. The method of recording an image while a plurality of long recording sheets are selectively being fed to a recording section, comprising the steps of specifying a desired one of the plurality of recording sheets; and locating the leading edge of the desired one at a ready state at a position which is downstream with respect to a recording position of the recording section in the direction in which the recording sheet is fed. The apparatus is arranged such that image recording is performed in accordance with image information while a recording sheet unwound from one of first and second sheet rolls is being fed to a recording section including a recording head. One of the first and second recording sheets is set to a predetermined position in the recording section, after recording onto the recording sheet is completed.

34 Claims, 17 Drawing Sheets

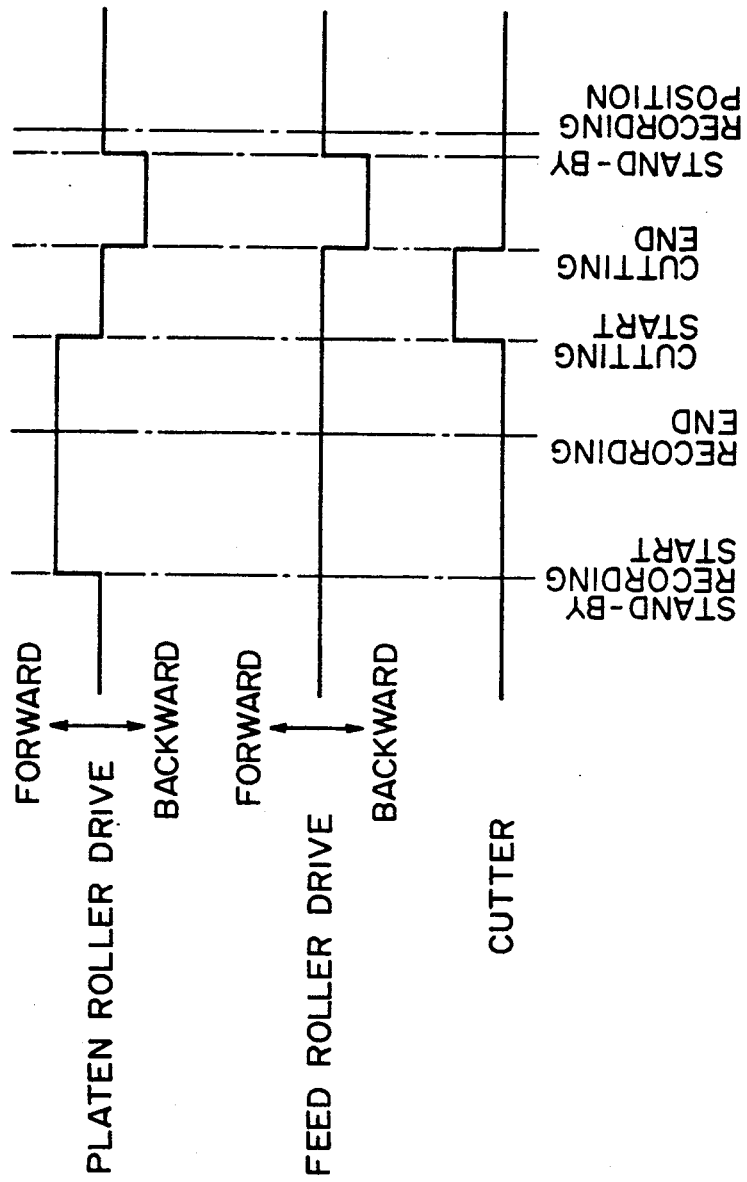

METHOD OF AN APPARATUS FOR RECORDING IMAGES, WHILE AVOIDING DAMAGE DUE TO PROLONGED CONTACT BETWEEN PLATEN AND RECORDING DEVICE

This application is a continuation of application Ser. No. 434,550, filed Nov. 13, 1989, which is a continuation of application Ser. No. 094,902, filed Sept. 10, 1987, both now abandoned.

BACKGROUND OF THE INVENTION

1. Field of the Invention

The present invention relates to a method of and an apparatus for selectively recording an image on a plurality of long recording sheets and, more particularly, to a recording method and a recording apparatus which can be applied to facsimile devices, electronic typewriters, printers, or the like.

2. Related Background Art

A double-roll type of apparatus has heretofore been known as a typical example of a recording apparatus incorporating a plurality of recording sheets. The double-roll apparatus is provided with two rolls of long recording sheet material.

An advantage of this recording apparatus is that, since recording sheets of different sizes can be incorporated therein, received image information can be selectively recorded on recording sheets in accordance with desired sheet size. The recording apparatus has another advantage in that it is possible to increase its recording capacity by incorporating a plurality of recording sheets of the same size.

In order to selectively feed the recording sheets to a recording section in accordance with received image information, this conventional double-roll type of recording apparatus has an arrangement in which, after information corresponding to one communication unit has been recorded, each leading edge of the recording sheets is moved back to a ready position that is upstream with respect to the print position of the recording section in the direction of feed of the sheets, in preparation for the succeeding recording.

Therefore, when information received as one communication unit has been recorded, a platen roller and a recording head which constitute in combination the recording section are pressed in direct contact with each other for a long period, until the succeeding recording starts. As a result, the platen roller and the recording head may stick to each other due to variations in temperature or humidity within the recording apparatus. If the platen roller is rotated in this state, the recording head may be damaged or the platen roller may be deformed.

In a case where one of the two incorporated sheet rolls is frequently employed, each time the recording of information received as one communication unit starts or terminates, the leading edge of the more frequently used recording sheet must be moved back and forth between the recording section and the ready position at which the leading edge is located in preparation for the succeeding recording. This is an unnecessary motion and may lead to the occurrence of jamming when the leading edge of the recording sheet enters the recording section.

SUMMARY OF THE INVENTION

It is therefore an object of the present invention to provide a method of recording an image in which the operation thereof is improved, and an apparatus for carrying out the same.

It is another object of the present invention to provide a method of recording an image which does require unwanted motions of a recording sheet, and an apparatus for carrying out the same.

It is another object of the present invention to provide a method of recording an image which reduces the time required for recording, and an apparatus for carrying out the same.

It is another object of the present invention to provide a method of efficiently recording an image, employing a plurality of long recording sheets, and an apparatus for carrying out the same.

It is another object of the present invention to provide a method of recording an image which increases the durability of a recording section, and an apparatus for carrying out the same.

In one respect of the present invention is provided a method of recording an image in which, since one recording sheet of a plurality of incorporated recording sheet rolls is always inserted into a recording section at the time of start of recording, recording can immediately be performed and the likelihood of jamming of the recording sheet is reduced as well as the life time of the recording head can be improved.

In another aspect of the present invention is provided a method of recording an image in which, since the size of the recording sheet is changed, if necessary, during a predetermined period from a determination of the size of the image received from a remote station to a decision on the communication conditions required, it is possible to allocate sufficient time for sheet change, and an apparatus for carrying out the same.

To these ends, the present invention provides a method of and an apparatus for recording an image. The method of recording an image while a plurality of long recording sheets are selectively being fed to a recording section, according to one aspect of the invention, comprises the steps of specifying a desired one of the plurality of recording sheets and locating the leading edge of the desired one at a ready state at a position which is downstream with respect to a recording position of the recording section in the direction in which the recording sheet is fed. The apparatus is arranged such that image recording is performed in accordance with image information while a recording sheet unwound from one of first and second sheet rolls is being fed to a recording section including a recoding head. One of the first and second recording sheets is set to a predetermined position in the recording section, after recording onto the recording sheet is completed.

Further objects, features and advantages of the present invention will become apparent from the following description of the preferred embodiments of the present invention with reference to the accompanying drawings.

BRIEF DESCRIPTION OF THE DRAWINGS

FIGS. 6A and 6B are timing charts of the operation of each member during a recording operation in accordance with one embodiment of the present invention;

DESCRIPTION OF THE PREFERRED EMBODIMENTS

Preferred embodiments of the present invention will be described below with reference to the accompanying drawings.

In a first preferred embodiment which will be described below, when recording on a first or second recording sheet is completed, one of them is automatically positioned at a predetermined location between a platen and a recording head. Accordingly, the platen and the recording head are not pressed in direct contact with each other for a long period of time. In addition, since the one of the two recording sheets which has the higher frequency of use is always maintained in a ready state, it is possible to instantaneously start recording on that recording sheet, thereby enabling the elimination of any unnecessary motion of the recording sheets.

The following is a description of a double-roll type of facsimile device incorporating the first preferred embodiment.

Figure 1:
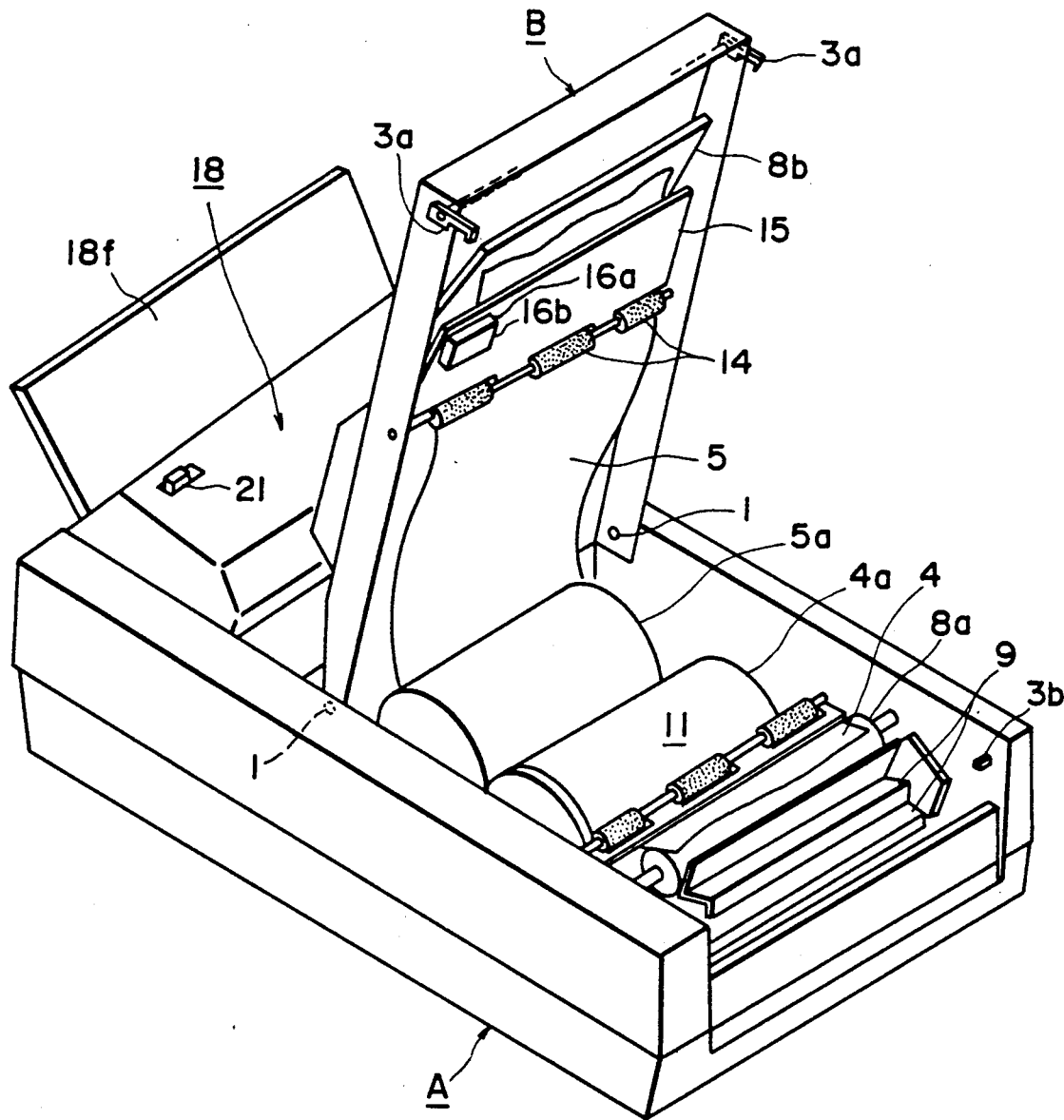
FIG. 1 is a diagrammatic, perspective view of a first preferred embodiment of the present invention and illustrates a state wherein a second cover or housing is disengaged from a first cover or housing A.
Figure 2:
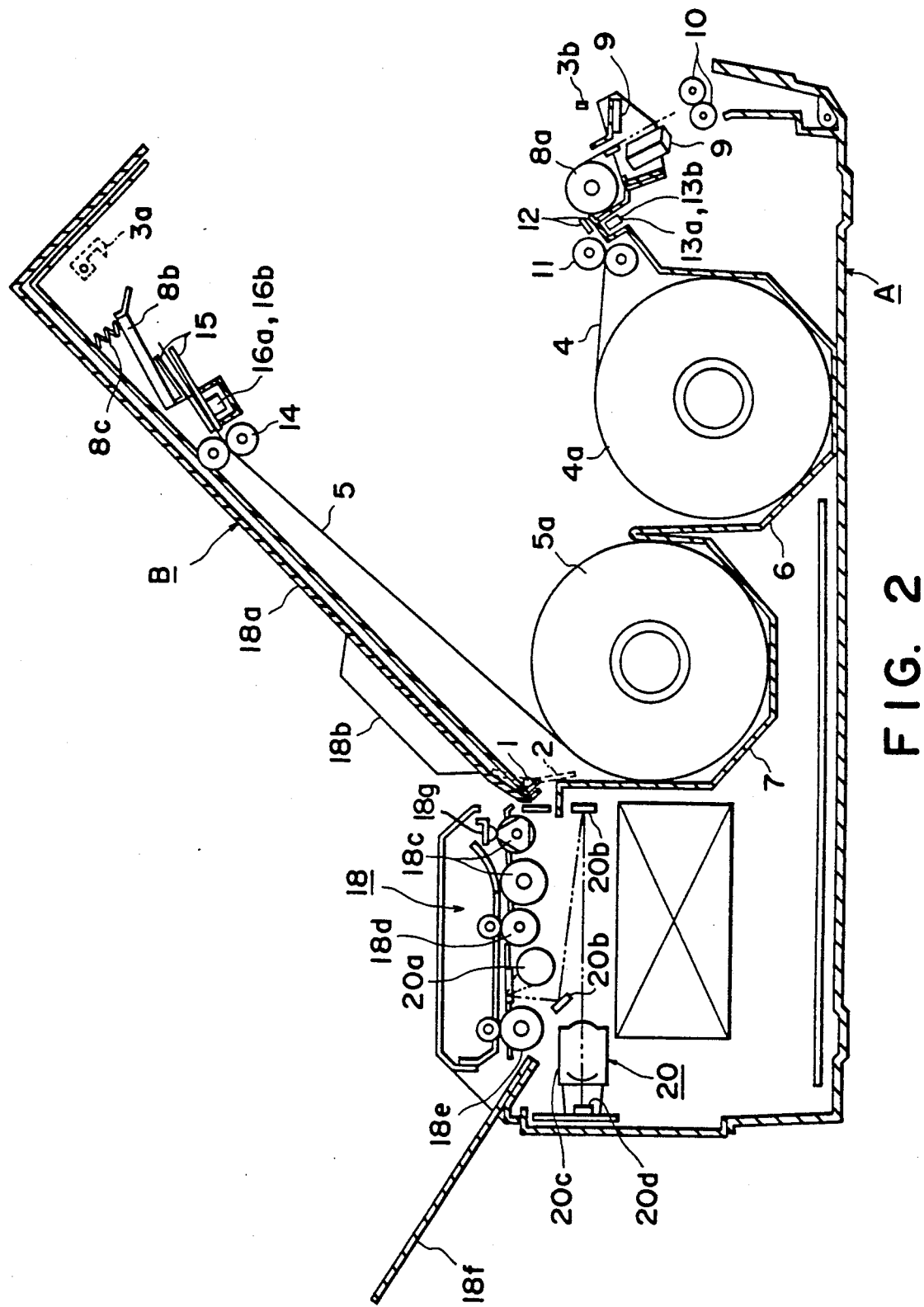
FIG. 2 is a cross-section of the first preferred embodiment shown in FIG. 1.
Figure 3:
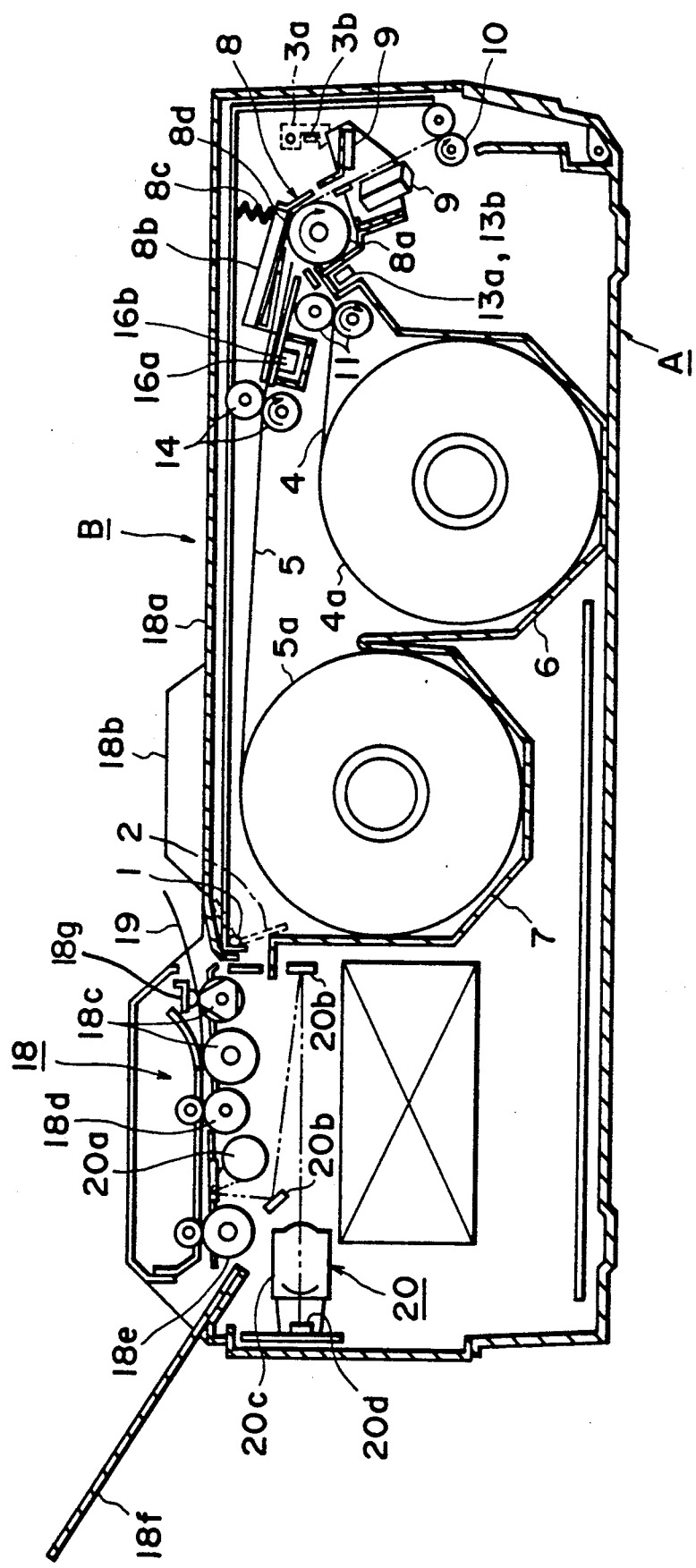
FIG. 3 is a cross-section of the first preferred embodiment and illustrates a state wherein the second cover B is engaged with the first cover A.

FIG. 1 is a diagrammatic, perspective view of the first preferred embodiment of the present invention and illustrates a state wherein a second cover or housing B is disengaged from a first cover A, FIG. 2 is a cross-section of the first preferred embodiment shown in FIG. 1, and FIG. 3 is a cross-section of first preferred embodiment illustrating a state wherein the second cover B is engaged with the first cover A.

Referring to FIGS. 1 to 3, the second cover B, serving as a lid member, is pivotally supported by shafts 1 attached to the first cover A, constituting the main body of a facsimile device. The second cover B is adapted to be opened and closed by rotation about the shafts 1. Each of the shafts 1, serving as the axis of rotation of the cover B, is provided with a spring 2, and the covers A and B have pairs of hooks 3a and 3b at their open ends, respectively. The hooks 3a and 3b are adapted to engage with each other. When the hooks 3a are disengaged from the hooks 3b, the second cover B is released from the first cover A by the urging force of the springs 2.

The first cover A includes a pair of drop-in roll holders 6 and 7 which are disposed parallel to each other, and different sizes of sheet rolls 4a and 5a of long recording sheets 4 and 5 can be separately stored in the roll holders 6 and 7. The recording sheets 4 and 5 stored in the roll holders 6 and 7 can be selectively fed to the recording section 8 in response to a selection signal from a control unit which will be described later with reference to FIGS. 4 and 7. In the recording section 8, a desired image is recorded on the thus-fed recording sheet. Subsequently, the recorded sheet is cut along the trailing edge of the recorded image by a cutter 9 disposed on the first cover A. The cut sheet is discharged from the facsimile device by a pair of discharge rollers 10.

The aforementioned recording section 8 includes a platen roller 8a which operates so as to feed one of the recording sheets 4 and 5 at a constant speed and a line-type recording head 8b (such as a thermal head having heating elements) which is arranged to press the recording sheet 4 or 5, constituted by a heat-sensitive sheet, against the platen roller 8a to heat the recording sheet in accordance with image information. The platen roller 8a is disposed on the first cover A while the recording head 8b is disposed on the second cover B. When the covers A and B are engaged with each other, the recording head 8b is pressed into contact with the platen roller 8a by the force of a pressure spring 8c attached to the rear of the recording head 8b.

The recording sheets 4 and 5 are fed to the recording section 8 by pairs of feed rollers 11 and 14, respectively. The pair of feed rollers 11 feed the recording sheet 4 which is accommodated in the roll holder 6 (hereinafter referred to as the "first holder") disposed nearer to the recording section 8. The feed rollers 11 are disposed at an intermediate position between the first holder 6 and the platen roller 8a, which are disposed in the first cover A. A sensor 13a for detecting the presence of the recording sheet 4 and a sensor 13b for detecting the width of the recording sheet 4 are disposed at an intermediate position between the pair of feed rollers 11 and the platen roller 8a in the first cover A, with a sheet guide 12 being interposed between the passage of the recording sheet 4 and the sensors 13a, 13b. The pair of feed rollers 14 feed the recording sheet 5 which is accommodated in the roll holder 7 (hereinafter referred to as the "second holder") disposed further away from the recording section 8. The feed rollers 14 are disposed at an intermediate position between the second holder 7 and the recording head 8b, which are disposed in the second cover B. A sensor 16a, such as a reflection-type sensor, for detecting the presence of the recording sheet 5 and a sensor 16b, such as a reflection-type sensor, for detecting the width of the recording sheet 5 are disposed at an intermediate position between the pair of feed rollers 14 and the recording head 8b in the second cover B.

Figure 7:
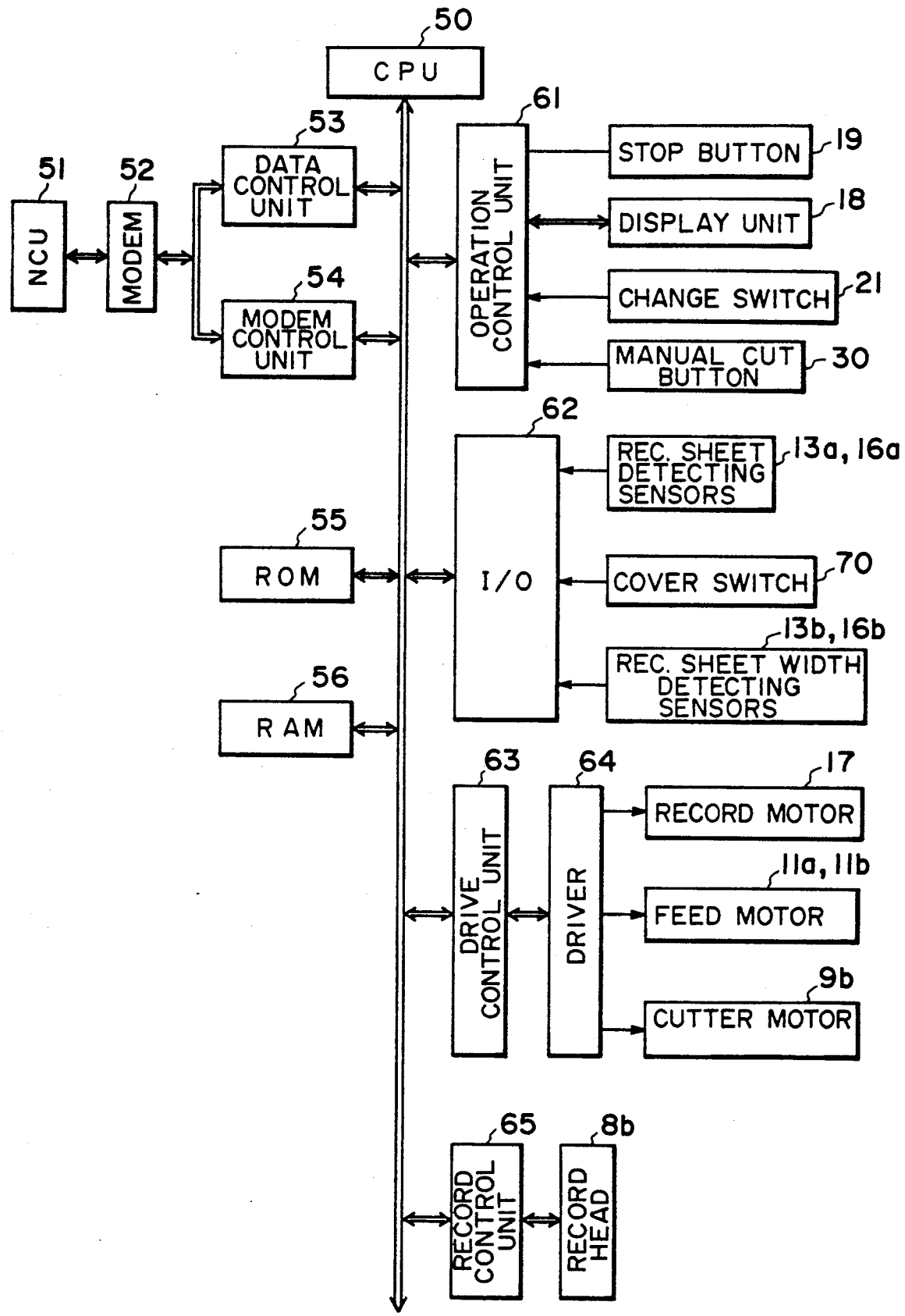
FIG. 7 is a block diagram of the arrangement of the drive system control used in the embodiment of FIG. 1.

As shown in FIGS. 3 and 7, the motions of the pairs of feed rollers 11, 14 and the platen roller 8a are respectively controlled by feed motors 11a, 11b and a recording motor 17 which are driven by signals from a CPU. A drive system and a control unit for driving the platen roller 8a and the pairs of feed rollers 11, 14 are incorporated in the first cover A.

In FIGS. 2 and 3, a system for feeding originals is indicated generally at 18. A stand portion 18a for bearing originals 19 is defined on the upper surface of the second cover B, and the originals 19 positioned between side guides 18b (of which only one is shown) are fed one by one by a pair of sheet separating rollers 18c (one of which being pressed by a sheet separating piece 18g). Each original 19 is fed to the left as viewed in FIGS. 2 and 3 by a feed roller 18d at a constant speed, and is discharged into a discharge tray 18f by a discharge roller 18e.

While the original 19 is being fed, it is illuminated by a light source 20a constituting part of an original-reading system 20. Light reflected from the original 19 passes through an optical path formed by a plurality of mirrors 20b and a lens 20c, and reaches an image reading device 20d such as a CCD. After an image of the original 19 has been read into the device 20d, the thus-obtained image information is transmitted to a predetermined recording system.

The following is a description of the operation of the facsimile device having the above-described arrangement.

In order to set the sheet rolls 4a and 5a, the hooks 3a and 3b are first disengaged from each other to release the second cover B from the first cover A, and the recording sheet 4 of, for example, A4 size, which is frequently used is accommodated in the first holder 6. The leading edge of the sheet 4 is passed through the gap between the feed rollers 11 and is positioned in the vicinity of the leading edge of the sheet guide 12. Similarly, the recording sheet 5 of, for example, A3 size, which is not so frequently used, is accommodated in the second holder 7, and the leading edge of the sheet 5 is passed through the gap between the feed rollers 14 and is positioned in the vicinity of the leading edge of another sheet guide 15. When the sheet rolls 4a and 5a are set, the frequency of their use is specified by operating a selector switch 21.

After the sheet rolls 4a and 5a have been set, the second cover B is closed, and a manual cutting operation is performed. This operation is performed after the system detects, by the sheet-presence detecting sensors 13a and 16a, the fact that the sheet rolls 4a and 5a are set.

More specifically, when the recording sheets 4 and 5 are respectively detected by the sensors 13a and 16a when a manual cutting switch 30 is operated, the feed rollers 11 associated with the recording sheet 4 and the platen roller 8a are rotated in the directions indicated by arrows in FIG. 3 to feed the leading edge of the recording sheet 4 through the cutter 9 to the pair of discharge rollers 10. The thus-fed leading portion of the recording sheet 4 is cut by the cutter 9. The thus-cut piece of the recording sheet 4 is discharged from the body of the facsimile device. The platen roller 8a and the pair of feed rollers 11 are respectively rotated in directions opposite to the aforementioned directions to cause the new leading edge of the recording sheet 4 to move back to a ready position that is upstream with respect to the sheet-presence detecting sensor 13a and downstream of the recording section 8. The recording sheet 4 is maintained in a ready state at this position.

Subsequently, in the same manner as described above, the feed rollers 14, the platen roller 8a, and the cutter 9 are driven to cut the leading portion of the recording portion 5. The cut piece of the recording sheet 5 is discharged from the body of the facsimile device. The platen roller 8a and the pair of feed rollers 14 are respectively rotated in directions opposite to the aforementioned directions to cause the leading edge of the recording sheet 5 to move back to a ready position that is downstream with respect to the sheet-presence detecting sensor 16a and upstream of the recording section 8. The recording sheet 5 is maintained in a ready state at this position.

Subsequently, the recording sheet 4 which is more frequently used is moved back to the recording position.

The leading edges of the recording sheets 4 and 5, which are shaped by the above-described manual cutting operation, are moved to an accurate ready position by controlling the rotations of the feed rollers 11, 14 and the platen roller 8a. The leading edge of the recording sheet which is more frequently used is located downstream with respect to a print position 8d in the recording section 8. This arrangement enables recording on the recording sheet 4 without causing any unnecessary motion of the sheet 4. In addition, the recording sheet 4 is interposed between the recording head 8b and the platen roller 8a in the above-described ready state so as to prevent the recording head 8b from being pressed into direct contract with the platen roller 8a. Accordingly, even if they are maintained in the above-described ready state for a long period, the recording head 8b will not stick to the platen roller 8a.

Figure 6B:
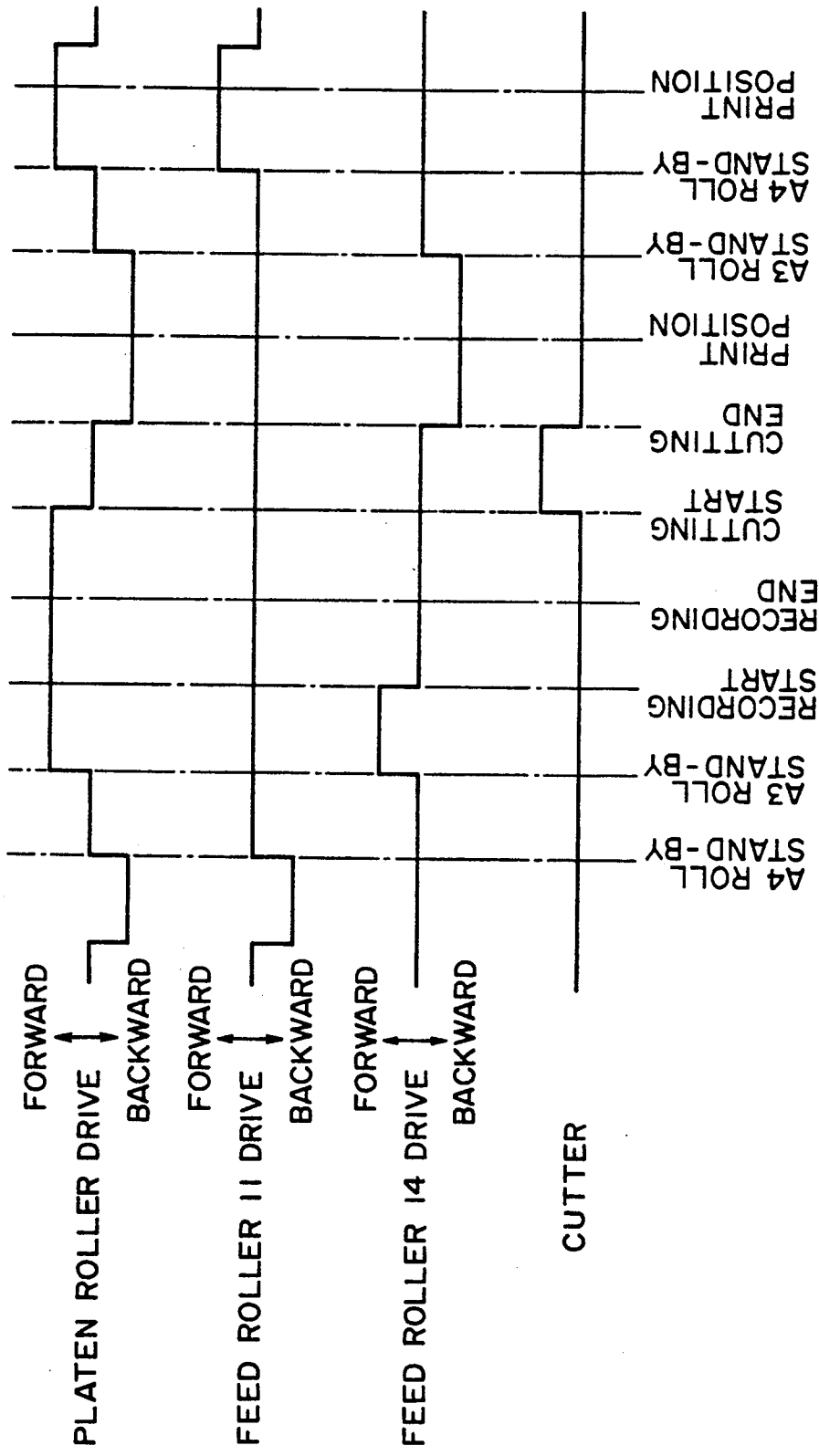

The following is a description of the recording operation of the first preferred embodiment. By way of example, it is assumed here that image information corresponding to a more frequently used A4-size sheet is received (for example, information read by a reader incorporated in the body if the device is operating in copy mode, or information sent from a remote facsimile device if the device is operating in reception mode). In this case, the sheet-width detecting sensors 13b detects the fact that the recording sheet 4 has an A4-size width, and the components of the device operate at the timing shown in FIG. 6A.

More specifically, the platen roller 8a is rotated in the direction of the arrow in FIG. 3 (hereinafter referred to as the "forward direction") to feed the recording sheet 4 at a constant speed. The recording head 8b generates heat in accordance with image information, in synchronization with this feeding operation, and the received image is recorded on the recording sheet 4 by the thus-generated heat. During this time, the feed rollers 11 are rotated by the travel of the recording sheet 4.

When the recording of the received image is completed in this manner, the recording sheet 4 is fed until the trailing edge of the recorded image reaches the position of the cutter 9, and is cut along this trailing edge by the cutter 9. The recorded cut sheet is discharged from the facsimile device by the discharge rollers 10. Simultaneously, the platen roller 8a and the feed rollers 11 are rotated in directions opposite to the directions of the arrows in FIG. 3 (hereinafter referred to as the "backward direction") to return the leading edge of the recording sheet 4 to a ready position which is separated from the print position 8d in the downstream direction by a length l of a margin which is defined along its leading edge of the recording sheet 4. In this manner A4-size recording is completed.

Figure 4:
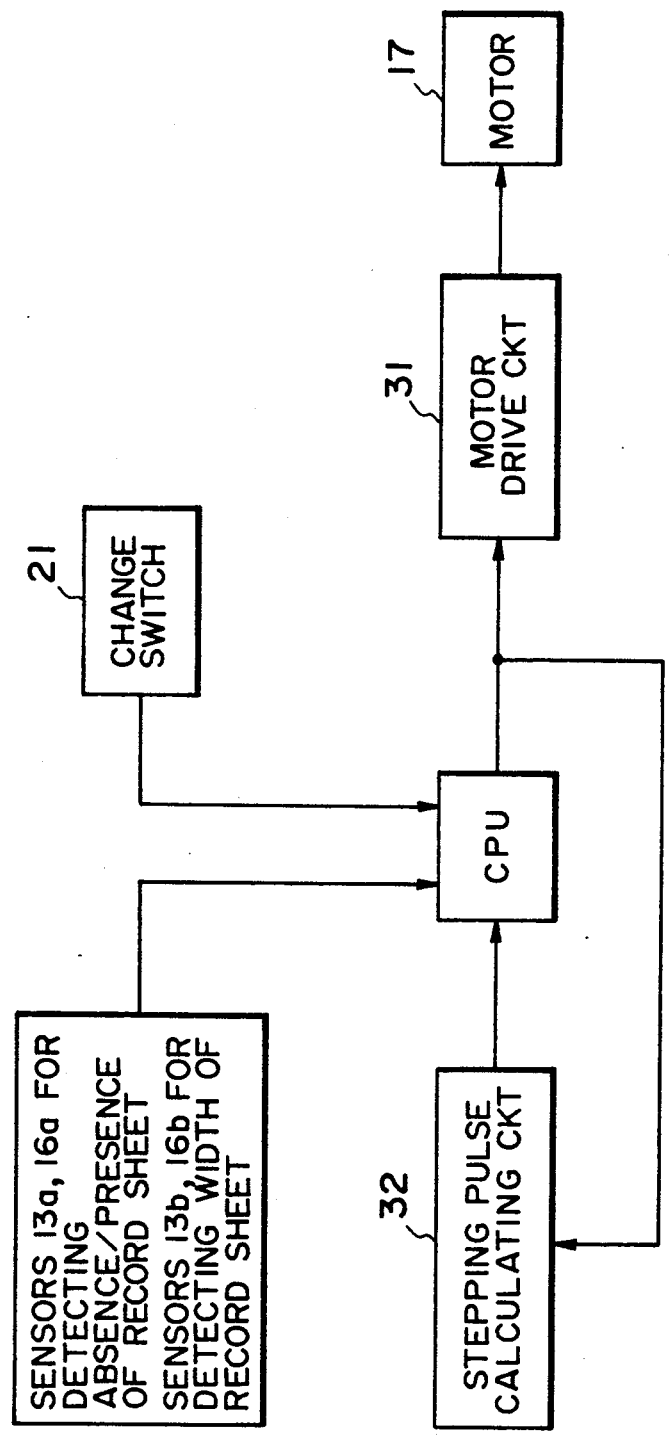
FIG. 4 is a schematic block diagram of the first preferred embodiment.

The feed rollers 11 and the platen roller 8a are controlled by the control unit. As shown in FIG. 4, the arrangement of the control unit is such that a recording-actuation signal from the CPU is transmitted to a motor drive circuit 31, and the motor 17 is driven by the circuit 31. A step-pulse counting circuit 32 counts the number of steps through which the motor 17 rotates, and the rotation of the motor 17 is controlled in accordance with the counted number of steps. More specifically, when the motor 17 is rotated in the forward direction, the number of steps through which the motor 17 rotates is counted to determine whether the trailing edge of the recorded image has been fed from the recording section 8 to the position of the cutter 9. When the motor 17 is reversed, in a similar manner, a decision is made as to whether the leading edge of the recording sheet 4 has moved from the position of the cutter 9 to the ready position which is upstream of the recording section 8. In this manner, the motor 17 is driven or stopped, or its speed is controlled, by the CPU in response to signals from the step-pulse counting circuit 32. FIG. 7 diagrammatically illustrates details of the control exerted by the CPU.

If A3-size image information is received when the recording sheet 4 is in the ready state, the sheet-width detecting sensor 16b detects the fact that the recording sheet 5 is A3 size. In accordance with the timing shown in FIG. 6B, the recording sheet 4 is reversed from the recording section 8 toward the feed rollers 11 while the recording sheet 5 is inserted into the recording section 8. In this state, A3-size information is recorded onto the recording sheet 5.

Figure 5A:
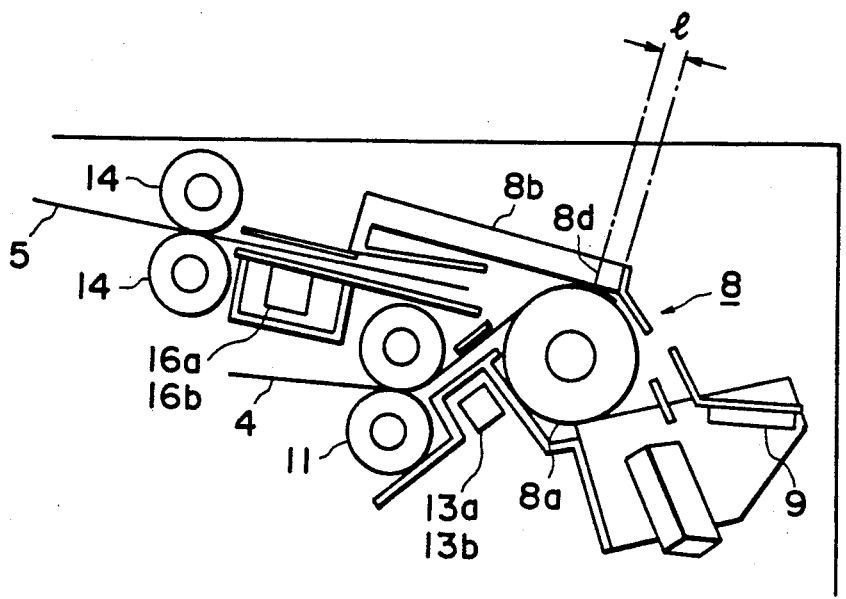
FIGS. 5A and 5C are schematic illustrations of the feed of recording sheets in accordance with one embodiment of the present invention.
Figure 5B:
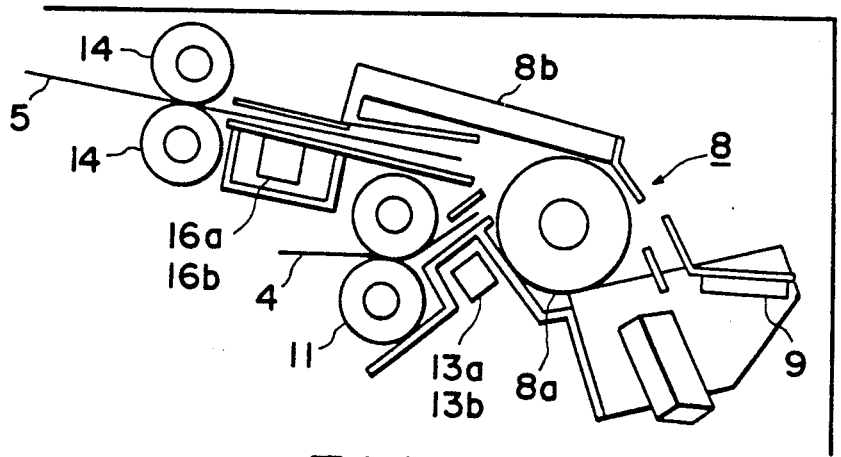

More specifically, the platen roller 8a and the pair of feed rollers 11 are respectively rotated in the reverse directions to cause the leading edge of the recording sheet 4 to move back to a predetermined ready position which is, as shown in FIG. 5B, downstream with respect to the sheet-presence detecting sensor 13a and upstream of the recording section 8. The recording sheet 4 is maintained in a ready state at the predetermined position.

Figure 5C:
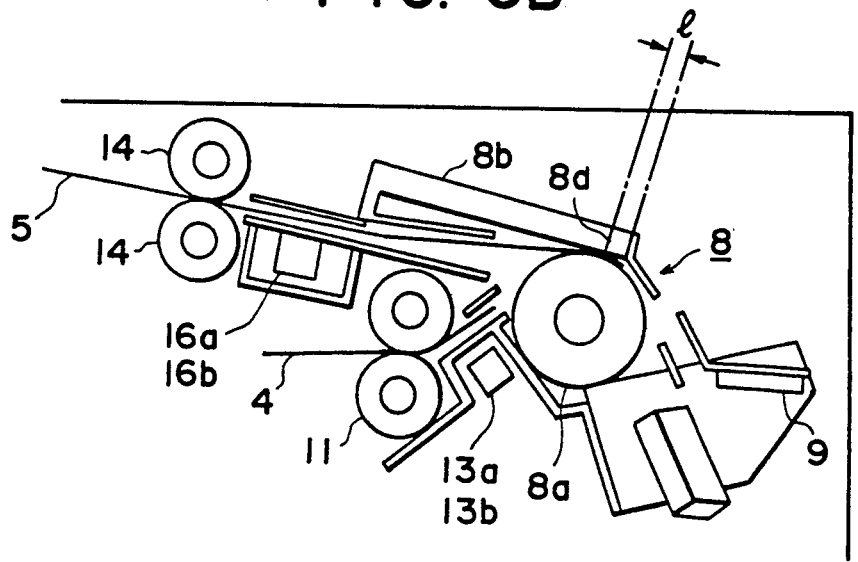

The pair of feed rollers 14 and the platen roller 8a are rotated in the forward direction to feed the recording sheet 5 to the recording section 8. As shown in FIG. 5C, the leading edge of the recording sheet 5 is fed to a predetermined position which is separated from the print position 8d in the downstream direction by the length l of the margin defined along the leading edge of the recording sheet 5, the recording head 8b being pressed against the platen roller 8a at the print position 8d. When the leading edge of the recording sheet 5 reaches that predetermined position, the feed rollers 14 stop their driving motion, and thus the recording sheet 5 is fed to the platen roller 8a at a constant speed. During this time, the feed rollers 14 are rotated by the travel of the recording sheet 5.

The recording head 8b is driven in synchronization with the above-described constant feed to record received image information on the recording sheet 5. When the recording is completed, the trailing edge of the thus-recorded image is fed to the position of the cutter 9, as in the case of the above-described recording sheet 4. The recording sheet 5 is cut along the trailing edge of the recorded image by the cutter 9. Then the leading edge of the recording sheet 5 is moved back to a predetermined ready position as shown in FIG. 5B. In addition, the platen roller 8a and the feed rollers 11 are rotated in the forward direction, and the leading edge of the recording sheet 4 is fed to a ready position which is separated from the print position 8d in the downstream direction by a length l of the margin defined along the leading edge of the recording sheet 4. In this manner, the recording sheet 4 is maintained in a ready state.

Therefore, each time a recording operation is completed, the leading edge of the recording sheet 4 which is more frequently used is fed to the predetermined ready position which is downstream of the recording section 8. Accordingly, it is possible to start recording immediately A4-size information is received.

FIG. 7 is a block diagram of another illustrative example of a facsimile device to which the first embodiment is applied, illustrating the block diagram of FIG. 4 in more detail.

As illustratively shown in block form, the facsimile device comprises a CPU 50 for controlling all components of the device, an NCU (network control unit) 51, a modem 52, a data control unit 53, a modem control unit 54, a ROM 55 which contains programs which are illustrated in flow charts, and a RAM 56 which also serves as a working area. The facsimile device further includes an operation control unit 61, an I/O unit 62, a drive control unit 63, a driver 64, a recording control unit 65, the selector switch 21, the manual cutting switch 30 which is pressed by the operator to initialize the position of the leading edges of the operator to initialize the position of the leading edges of the recording sheets, and a display unit 18. In addition, the facsimile device includes the sheet-presence detecting sensors 13a and 16b for respectively detecting the presences of the recording sheets 4 and 5, the sheet-width detecting sensors 13b and 16b for respectively detecting the widths of the recording sheets 4 and 5, a cover switch 70 for detecting engagement and disengagement between the covers A and B, the recording head 8b, and a stop button 19 which can be pressed by the operator to forcibly stop the recording operation of the device.

The operation control unit 61 causes the display unit 18 to produce a visual display while the operator is in conversation with the unit 61, and receives an instruction indicative of manual cutting from the manual cutting switch 17. The I/O 62 receives an instruction indicating that the device's operation is to be forcibly stopped for the stop button 19, and receives signals from the sheet-presence detecting sensors (which may be reflection-type sensors) 13a, 16a and from the sheet-width detecting sensors 13b, 16b. The driver 64 is adapted to drive the recording motor 17, the feed motors 11a, 11b and the cutter motor 9b.

The cover switch 70 is adapted to detect the engagement and disengagement between the covers A and B by electrical power supplied from a backup power source (not shown) when the main power source is off. The covers A and B are disengaged from each other when, for example, the sheet roll 4 or 5 is replaced.

It is to be noted that the shapes of the covers A and B are illustrative and not restrictive, and it is of course possible to adopt any shape that allows the covers A and B to disengage from each other for sheet replacement.

Figure 8:
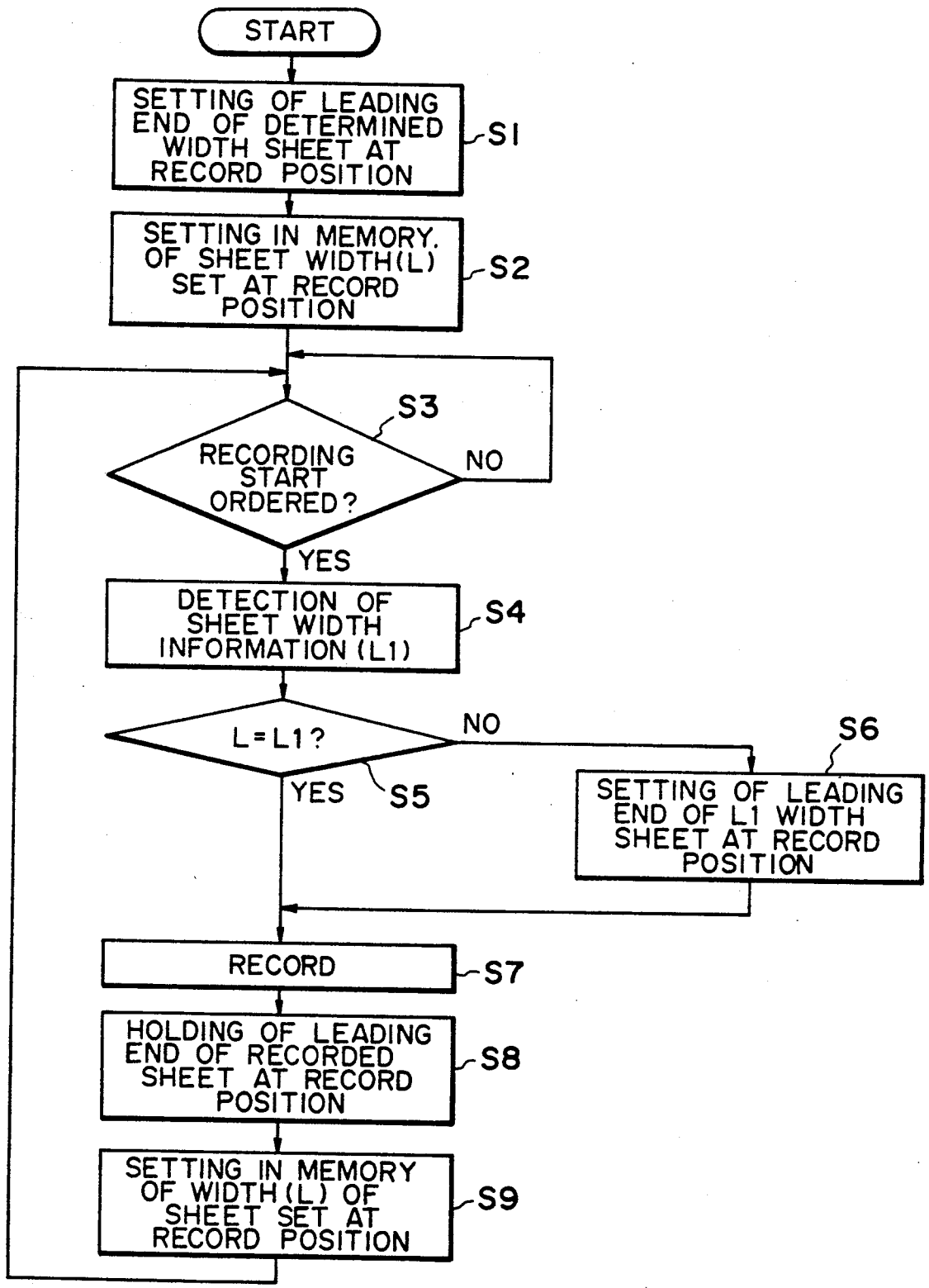
FIG. 8 is a flow chart of another example of the operation of the first preferred embodiment.

FIG. 8 is a flow chart illustrating in more detail the operation of the facsimile device to which the first embodiment is applied.

In Step S1, the leading edge of one of the recording sheet 4 and 5 that has a desired width is fed to a recording position at which information is recorded on the recording sheet. In Step S2, the width L of the recording sheet which is set to the recording position is stored in a memory. In Step S3, the recording sheet is maintained in a ready state until a request for recording is received. If such a request is received, the process proceeds to Step S4, in which information L1 representative of the width of a desired recording sheet on which information is to be recorded is detected on the basis of a DCS (data collection system).

If it is judged in Step 5 that the width L of the recording sheet which is set at the recording position coincides with the width represented by the information L1, the process proceeds to Step S7, in which recording immediately starts.

If it is judged in Step 5 that the width L differs from the width L1, the process proceeds to Step S6, in which the recording sheet which is previously set is returned to the ready position while the leading edge of the recording sheet that has the width L1 is fed to the recording position. Then the process proceeds to Step S7, in which recording starts.

Subsequently, after the recording has been completed, the process proceeds to Step S8, in which the leading edge of the recording sheet on which recording is effected is maintained at the recording position. In Step 9, the width (the new L) of the recording sheet which is set to the recording position is stored in the memory. The thus-set recording sheet is maintained in a ready state until the next request for recording is detected.

Figure 9:
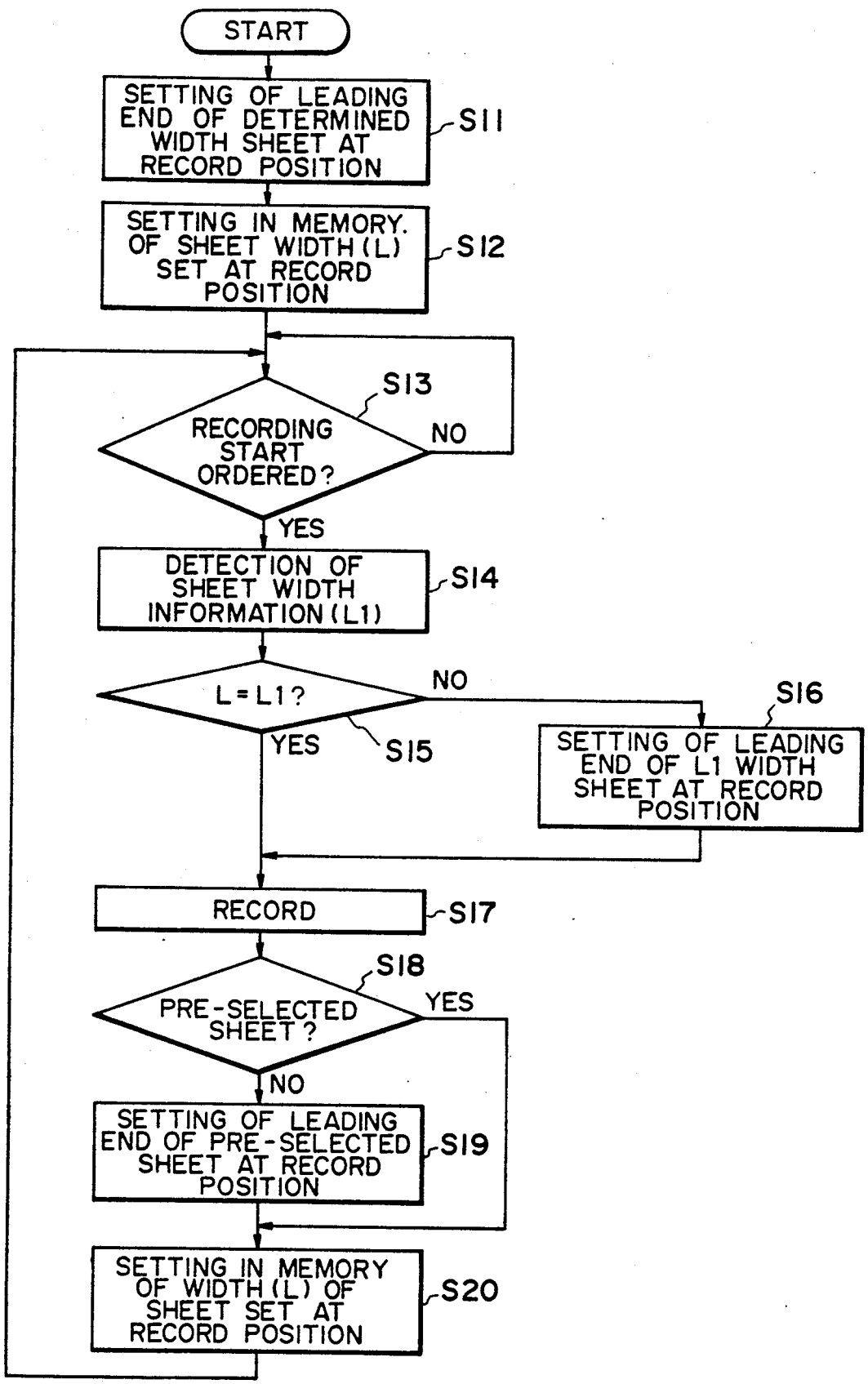
FIG. 9 is a flow chart of still another example of the operation of the first preferred embodiment.
Figure 10:
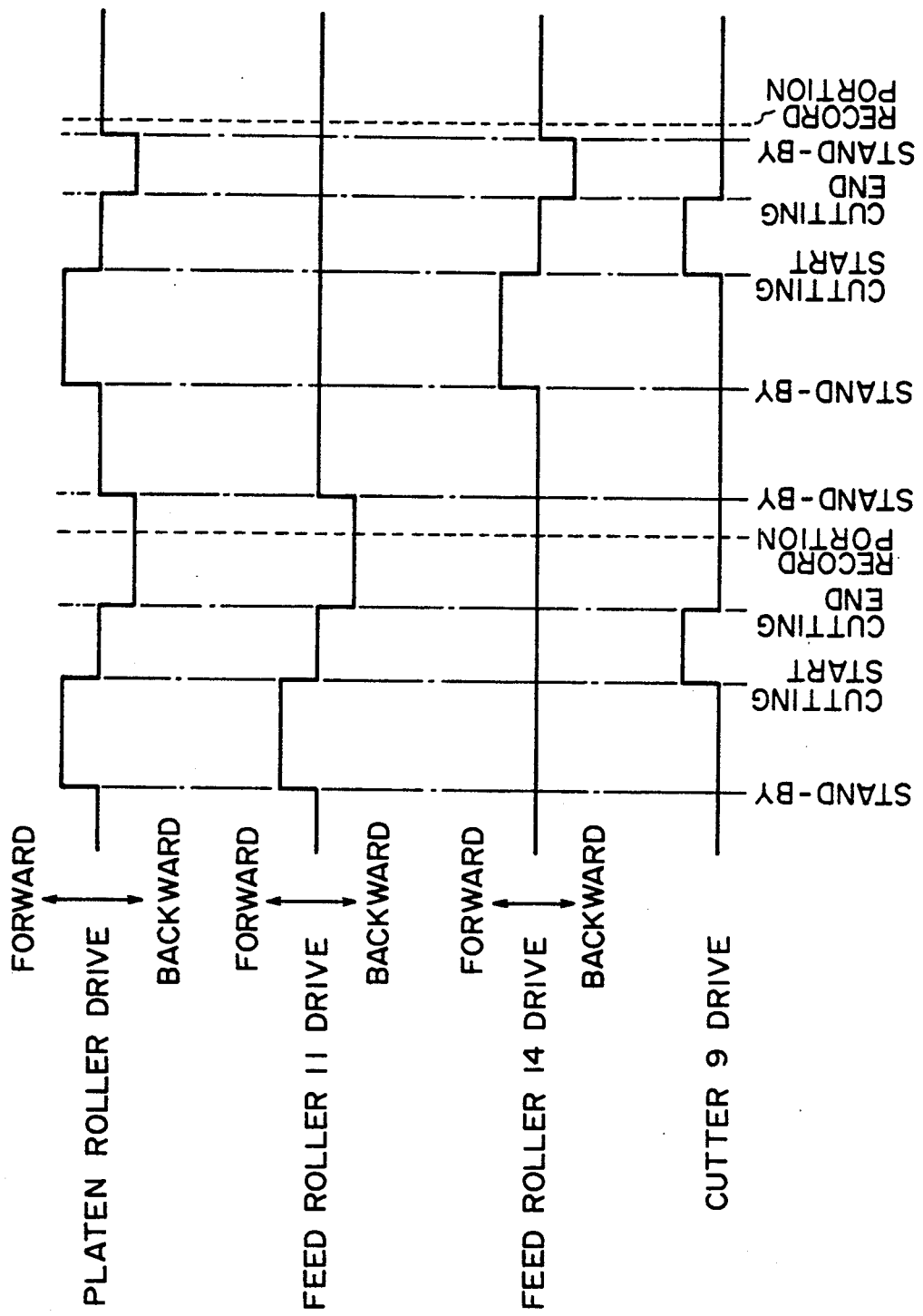
FIG. 10 is a timing chart of the operation of a second preferred embodiment of the present invention.

FIG. 9 is a flow chart of still another example of the operation of the facsimile device to which the first embodiment is applied. The flow chart of FIG. 9 differs from the flow chart of FIG. 8 in that, instead of Step 8, Step 18 and 19 are incorporated.

More specifically, after recording has been performed in Step 17, judgment is made in Step 18 as to whether or not the width of the recording sheet used for that recording coincides with the width of a recording sheet which is previously selected, as by the selector switch 21. If the answer in Step 10 is "NO", the process proceeds to Step S19, in which the recording sheet used in the aforesaid recording is returned to its ready position while the previously selected recording sheet is fed downstream until its leading edge reaches the recording position. In Step 20, the width of the recording sheet which has been newly set at the recording position is stored in the memory.

If it is judged in Step 18 that the width of the recording sheet used for the above-described recording coincides with the width of the recording sheet which is previously selected, the process jumps to Step 20, in which the recording sheet used for that recording is maintained at the recording position.

It is to be noted that the recording sheets may be selected from, for example, thermal sheets, plastic sheets and ordinary sheets. Also, the present invention is not confined solely to a heat-sensitive recording system which has been mentioned in the description of the first embodiment, and is also applicable to a facsimile device of the type employing a so-called heat-sensitive transfer system using, for example, inked sheets. In addition, the form of the platen is not limited to a roll, and, for example, a planar platen may preferably be employed.

The above description refers to the recording of image information onto a single A3-size recording sheet. If a plurality of pages of received A3-size information are to be sequentially recorded on a plurality of A3-size recording sheets, the following operation is performed. Each time information corresponding to one page is recorded, the trailing edge of the recorded image is fed to the position of the cutter 9, and the recording sheet 5 is cut along that trailing edge by the cutter 9. Subsequently, the platen roller 8a and the feed rollers 14 are reversed to cause the leading edge of the recording sheet 5 to move back to the ready position which is, as shown in FIG. 5C, separated from the print position 8d in the recording section 8 in the downstream direction by a length 1 of the margin which is defined along the leading edge of the recording sheet 5. Then the driving rotations of the feed rollers 14 are stopped and the platen roller 8a is rotated in the forward direction to start recording the next page. This operation is repeated until the last page is recorded. When the last recording is completed, as in the previously-described case where a single received image is recorded, the recording sheets 4 and 5 are respectively returned to their ready positions, as shown in FIG. 5A, in preparation for the next recording. This eliminates the unnecessary motion of the recording sheet 5.

In the above-described first embodiment, by way of example, the A4-size sheet roll 4a and the A3-size sheet roll 5a are respectively accommodated in the first holder 6 and the second holder 7. However, this arrangement is illustrative and not restrictive, and any size of a sheet roll can be accommodated in either of these holders. In this case, as shown in block form in FIG. 4, the selector switch 21 is operated to determine which of the recording sheets should be more frequently used, that is, which of the recording sheets should be located at the predetermined ready position which is downstream with respect to the print position 8d in the recording section 8.

In the first embodiment, two sheet rolls are set in the facsimile device, but the number of sheet rolls used is illustrative and not restrictive. It will be appreciated that, even if three or more sheet rolls are incorporated, it is possible to maintain the leading edge of the most frequently used one at the ready position which is downstream of the recording section of the device.

In the first embodiment, the recording section 8 is illustratively constituted by a thermal head and a platen roller. However, for example, the recording section 8 may preferably be constituted by an ink jet system employing a platen and an ink jet head as a recording head. Even in a case where the ink jet recording system is employed, the present invention is capable of effecting recording without causing any unnecessary motion of the recording sheet.

It is to be noted that, although, in the illustrated first embodiment, the recording head is always maintained in contact with the platen roller, a gap is generally established between the recording head and the platen roller in the ink jet recording system.

It is to be noted that the recording sheets may be selected from, for example, thermal sheets, plastic sheets and ordinary sheets. Also, the present invention is not confined solely to a heat-sensitive recording system which has been mentioned in the description of the first embodiment, and is also applicable to recording apparatus of the type employing a so-called heat-sensitive transfer system using, for example, inked sheets. In addition, the form of the platen is not limited to a roll, and, for example, a planar platen may preferably be employed. In this case, another sheet may be fed by another roller or the like.

In addition, although two rolls of long sheets are used in the first embodiment by way of example, the present invention is of course applicable to an arrangement in which three or more rolls of long sheets are employed.

As described above, in the first embodiment, the recording sheet is held in a ready state between the recording head and the platen roller. Accordingly, it is possible to eliminate any unnecessary motion of the recording sheet. In addition, even if the recording head is pressed in direct contact with the platen, the recording sheet is always interposed therebetween. Therefore, the recording head is not pressed in direct contact with the platen roller for a long period, and thus, it is possible to prevent the recording head from being damaged or worn.

A second preferred embodiment of the present invention will be described below with reference to FIGS. 10 to 13.

The second embodiment which will be described below is effective when applied to the facsimile device shown in FIGS. 1 to 3. Therefore, the description thereof is made with specific reference to FIGS. 1 to 4 and FIG. 7.

In the second embodiment, in which an image is recorded while a recording sheet unwound from one sheet roll is being fed to a recording section, first and second rolls of recording sheets are set, and one of the recording sheets is selectively fed to the recording section in response to a predetermined signal, to effect the recording of received image information. In this case, if the two rolls have the same width, the leading edge of one of the recording sheets is maintained in a ready state at a predetermined position which is upstream of the recording section, while the leading edge of the other recording sheet is maintained in a ready state at a predetermined position which is downstream with respect to a print position in the recording section.

In the second embodiment, since two kinds of recording sheet are set, it is possible to effect recording on the recording sheet which corresponds to the size of the received image information. If the two rolls have the same width, the leading edge of one of the recording sheets is maintained in a ready state at a predetermined position which is downstream of the recording section. Accordingly, it is possible to immediately start recording in the recording section, and this enables a reduction in the time required for recording. In addition, it is not necessary to insert the leading edge of the recording sheet into the recording section each time recording is effected, and this significantly reduces the likelihood of jamming of the recording sheet. Moreover, while the recording head is being pressed in direct contact with the platen roller, the platen roll does not rotate in this state. Accordingly, it is possible to prevent the recording head from wearing due to its contact with the platen roller under pressure.

Figure 11:
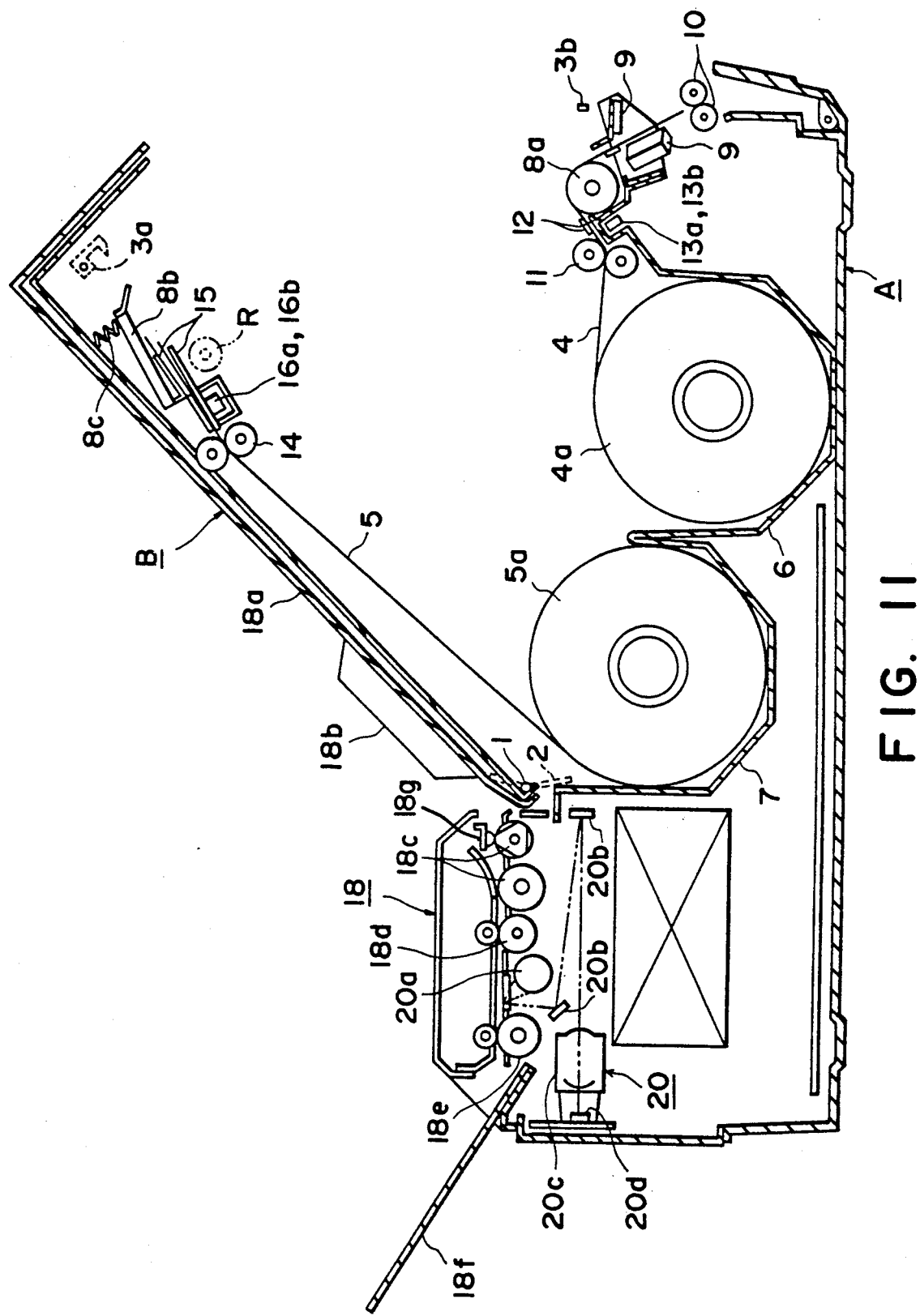
FIG. 11 is a cross section of the second embodiment of the present invention and illustrates the manner of incorporating a plurality of recording sheets therein.
Figure 12:
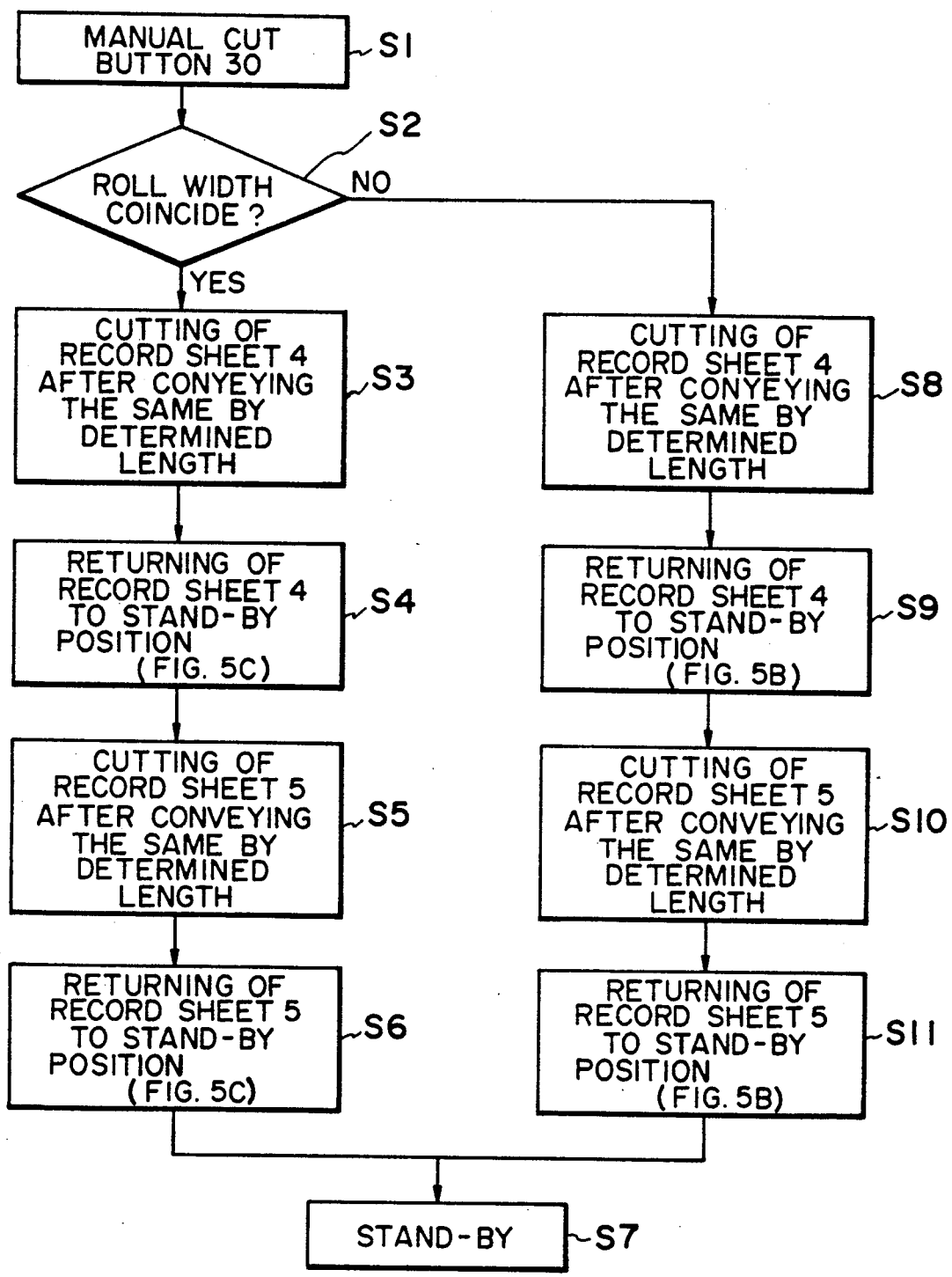
FIG. 12 is a flow chart of the manual cutting operation which is performed in each preferred embodiments of the present invention.

The operation of the second embodiment is described with reference to FIGS. 1 to 5, 7, and 10 to 13. FIG. 12 is a flow chart of the manual cutting operation which is performed when setting the sheet rolls.

In order to set the sheet rolls 4a and 5a, the hooks 3a and 3b are first disengaged from each other to release the second cover B from the first cover A, and the recording sheet 4a of, for example, A4 size is accommodated in the first holder 6. The leading edge of the sheet 4 is passed through the gap between the feed rollers 11 and is positioned in the vicinity of the leading edge of the sheet guide 12. Similarly, the recording sheet 5a of, for example, A3 size is accommodated in the second holder 7, and the leading edge of the sheet 5 is passed through the gap between the feed rollers 14 and is positioned in the vicinity of the leading edge of the sheet guide 15.

Referring to the flow chart of FIG. 12, after the sheet rolls 4a and 5a have been set in the above-described manner, the second cover B is closed, and the manual cutting button 30 is depressed (Step S1). Then judgment is made (Step S2) as to whether or not the sheet rolls 4a and 5a have the same size. More specifically, the A4-size sheet roll 4a is detected by the sheet-presence detecting sensor 13a and the sheet-width detecting sensor 13b while the A4-size sheet roll 5a is detected by the sheet-presence detecting sensor 16a and the sheet-width detecting sensor 16b.

As shown in FIG. 4, signals are transmitted to the CPU from the sheet-presence detecting sensor 13a, 16a and the sheet-width detecting sensors 13b, 16b. Subsequently, in accordance with the timing shown in FIG. 10, the rotations of the platen roller 8a and the feed rollers 11, 14 as well as the action of the cutter 9 are controlled by the control unit, to perform a manual cutting operation.

This manual cutting operation is described below with reference to FIG. 12. The feed rollers 11 associated with the recording sheet 4 and the platen roller 8a are respectively rotated in the directions indicated by the arrows shown in FIG. 3 to feed the leading edge of the recording sheet 4 through the cutter 9 to the pair of discharge rollers 10. The thus-fed leading portion of the recording sheet 4 is cut by the cutter 9 (Step S3). The thus-cut piece of the recording sheet 4 is discharged from the body of the facsimile device. The platen roller 8a and the pair of feed rollers 11 are respectively rotated in the directions opposite to the aforementioned directions to cause the leading edge of the recording sheet 4 to move back to the ready position that, as shown in FIG. 5C, is upstream with respect to the sheet-presence detecting sensor 13a and downstream of the recording section 8. The recording sheet 4 is thus maintained in a ready state at this position (Step S4). Subsequently, in the same manner as described above, the feed rollers 14, the platen roller 8a and the cutter 9 are driven to cut the leading portion of the recording sheet 5 (Step S5). After cutting, the leading edge of the recording sheet 5 is moved back to the predetermined ready position which, as shown in FIG. 5C, is separated from the print position 8d in the downstream direction by the length l of the margin which is defined along the leading edge of the recording sheet 4 (Step S6). The recording sheet 5 is thus maintained in a ready state at this position (Step S7).

On the other hand, if it is judged (Step S2) that the widths of the rolls 4a and 5a differ from each other, the process proceeds to Step S8. Steps S8 to S10 correspond to the above-described Steps S3 to S5, but Step S11 differs from Step S6 in respect of a position to which the leading edge of the recording sheet 5 returns. Specifically, as shown in FIG. 5B, the leading edges of the recording sheets 4 and 5 are in a ready state at positions which are upstream with respect to the platen roller 8a.

Figure 13:
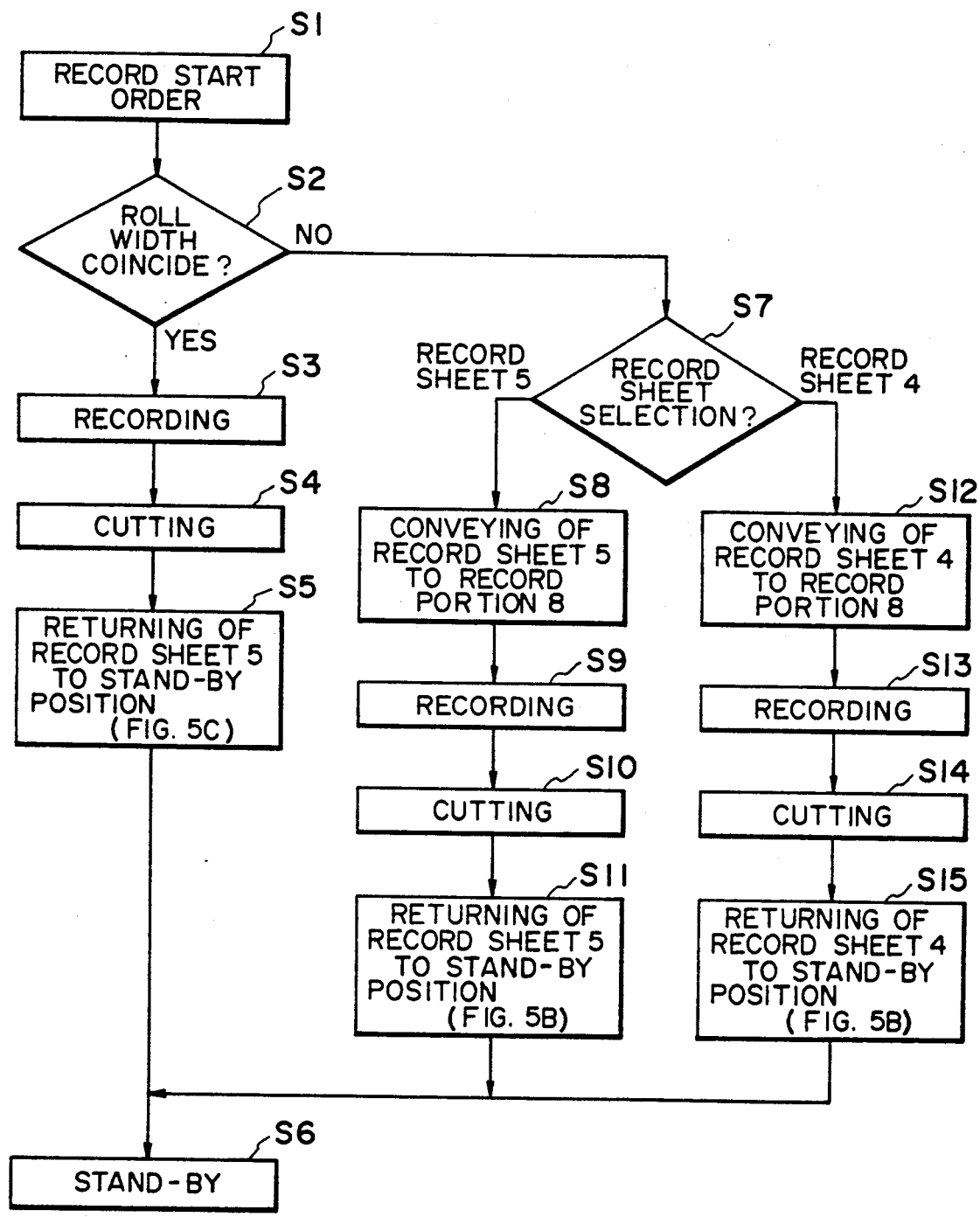
FIG. 13 is a flow chart of the recording operation which is performed in each preferred embodiments of the present invention.

The procedure of the recording operation will be described below with reference to the flow chart of FIG. 13 illustrating the recording operation of the device.

Each of the leading edges of the recording sheets 4 and 5 which are shaped by the above-described manual cutting operation is moved to an accurate ready position by controlling the rotations of the feed rollers 11, 14 and the platen roller 8a.

When a request for recording is received (Step S1), judgment is made (Step S2) as to whether or not the widths of the two sheet rolls are the same. If it is judged (Step S2) that they are the same and if image information corresponding to an A4-size sheet is received, the platen roller 8a is rotated in the direction of the arrow in FIG. 3 to feed the recording sheet 5 at a constant speed. The recording head 8b generates heat in accordance with image information, in synchronization with this feeding operation, and the received image is recorded on the recording sheet 5 by the thus-generated heat (Step S3). During this time, the feed rollers 14 are rotated by the travel of the recording sheet 5.

When the recording of the received image is completed in this manner, the recording sheet 5 is fed until the trailing edge of the recorded image reaches the position of the cutter 9, and is cut along the trailing edge by the cutter 9 (Step S4). The recorded cut sheet is discharged from the facsimile device by the discharge rollers 10. Simultaneously, the platen roller 8a and the feed rollers 14 are rotated in the directions opposite to the directions of the arrows in FIG. 3 to return the leading edge of the recording sheet 5 to the aforesaid ready position shown in FIG. 5C (Step S5). In this manner, the received A-size image is recorded (Step S6).

It is to be noted that, when a B4-size image is received, the received image is reduced from B4 to A4 by the CPU and is recorded on the recording sheet 5 in the above-described manner.

On the other hand, if it is judged (Step S2) that the widths of the sheet rolls differ from each other, the one of the recording sheets 4 and 5 which corresponds to the size of received information is selected (Step S7). If the sheet 5 is selected, the feed rollers 14 are rotated to feed the recording sheet 5 from the predetermined ready position shown in FIG. 5B to the recording section 8 (Step S8).

When the leading edge of the recording sheet 5 reaches the recording section 8, recording is effected (Step S9). Then the recorded image is cut along its trailing edge (Step S10). Step S9 and Step S10 correspond to the above-described Step S3 and Step S4, respectively Subsequently, the leading edge of the recording sheet 5 is moved back to the ready position which is, as shown in FIG. 5B, upstream with respect to the platen roller 8a (Step S11). In this manner, the recording sheet 5 is maintained in a ready state at that position (Step S6)

On the other hand, if the recording sheet 4 is selected in Step S7, recording is effected on the recording sheet 4 in Steps S12 to S15 which correspond to the above-described Steps S8 to S11.

The feed rollers and the platen roller are controlled by the control unit. As shown in FIG. 4, the arrangement of the control unit is such that recording-actuation signals from the CPU are transmitted to the motor drive circuit 31 and the motor 17 is driven by the circuit 31. The step-pulse counting circuit 32 counts the number of steps through which the motor 17 rotates Therefore, when the motor 17 is rotated in the forward direction, the number of steps though which the motor 17 rotates is counted by the step-pulse counting circuit 32 to determine whether the leading edge of the recording sheet 5 has been fed from its ready position to the recording section 8 and whether the trailing edge of the recorded image has been fed from the recording section 8 to the position of the cutter 9. When the motor 17 is reversed, as in the case of the forward rotation, a decision is made with respect to whether the leading edge of the recording sheet 5 has been reversed from the position of the cutter 9 to the ready position and whether the leading edge has been moved back from the recording section 8 to the ready position. In this manner, the motor 17 is driven or stopped, or its speed is controlled, by the CPU in response to signals from the step-pulse counting circuit 32.

If the sheet rolls 4a and 5a are both B4 size, the same operation as described above is performed. However, when a received image is B4 size, recording is effected at full size.

When the sheet-presence detecting sensor 16a detects the fact that the sheet roll 5a has been used up, the other control unit specifies that recording sheet 4 is employed.

In order to cope with jamming, the operator disengages the hooks 3a and 3b from each other to open the second cover B. The feed rollers 11 and 14 are separately disposed in the first and second covers A and B, respectively. Accordingly, when the second cover B is opened, the recording sheet 4 set in the first cover A is separated from the recording sheet 5 set in the second cover B. Therefore, while jamming of one of the recording sheets is being dealt with, the other recording sheet does not hinder to the operator. This arrangement also enables the sheet rolls 4a and 5a to be separately replaced. In addition, when the second cover B is opened, the sheet rolls 4a and 5a can be seen at the same time. Accordingly, the amount of the rolls remaining can easily be confirmed.

The platen roller 8a and the recording head 8b constituting the recording section 8 are separately incorporated in the first cover A and the second cover B, respectively, and the cutter is disposed in the first cover A. As shown in FIG. 11, the sheet rolls can be easily and positively set by passing the leading edge of, for example, the recording sheet 4, through the gap between the feed rollers 11, around the periphery of the platen roller 8a, through the cutter 9, and then through the gap between the discharge rollers 10 toward the exterior of the device. With this arrangement, it is also possible to prevent the recording sheet 4 from being set at an angle.

It is to be noted that the platen roller 8a may be incorporated in the second cover B while the recording head 8b may be incorporated in the first cover B. In this case, the same effect can be achieved.

In addition, the drive system including the feed rollers 11, 14, the platen roller 8a, and other related components are incorporated in the first cover A. Accordingly, the space within the device can be effectively utilized and the total weight of the second cover B can be reduced, thereby enabling a reduction in the size of the device.

It is to be noted that, as shown in FIG. 11, the lower driving roller of the pair of feed rollers 11 for feeding the recording sheet 4 may be disposed in the first cover A while the upper pressure roller R indicated by the dot-dot-dashed line, may be disposed in the second cover B in such a manner as to be pressed in contact with the lower roller. In this arrangement, when the second cover B is opened, the recording sheet 4 is released. It is thus easy to set a new roll and to deal with jamming. In this case, it is further effective to set a recording sheet of frequently used size in the first holder 6.

In the above-described embodiment, in the manual cutting operation, after the recording sheet 4 has been cut, the recording sheet 5 is cut, but the recording sheet 5 may first be cut. The ready states of the leading edges of the recording sheets in this case are illustrated in FIG. 5A. In this case, when image information is received after a manual cutting operation, all images are recorded on the recording sheet 4.

In the above-described embodiment, the sheet holders are disposed horizontally parallel to each other in the first cover A, but they may be disposed vertically parallel to each other.

In addition, in the above-described embodiment, the platen and the feed members are constituted by roll-shaped members, by way of example. However, as another example, a rotating belt passed between pulleys may be employed.

In the second embodiment as well, the leading edge of one of the recording sheets of the two sheet rolls is always in a ready state upstream of the recording section. Accordingly, it is possible to reduce the time required for recording, and the wear of the recording head can be prevented to prolong the life time thereof. In addition, it is possible to prevent the occurrence of jamming of the recording sheet.

A third referred embodiment of the present invention will be described below with reference to FIGS. 14 to 17.

The third preferred embodiment is provided with a plurality of recording sheets of different sizes. When image data is received, one of the recording sheets is selected and fed to a recording section to effect the recording of the received image data. A feature of the third embodiment is the inclusion of control means for changing the size of the recording sheet, if necessary, during a predetermined period in a communication sequence from a determination of the size of the image received from a remote station to a final decision on the communication conditions required.

In the third preferred embodiment, the size of the recording sheet can be changed, if necessary, during the period from the determination of the size of the image received from a remote station to the final decision on the communication conditions required. Accordingly, it is possible to allocate sufficient time for changing recording sheets.

Figure 14:
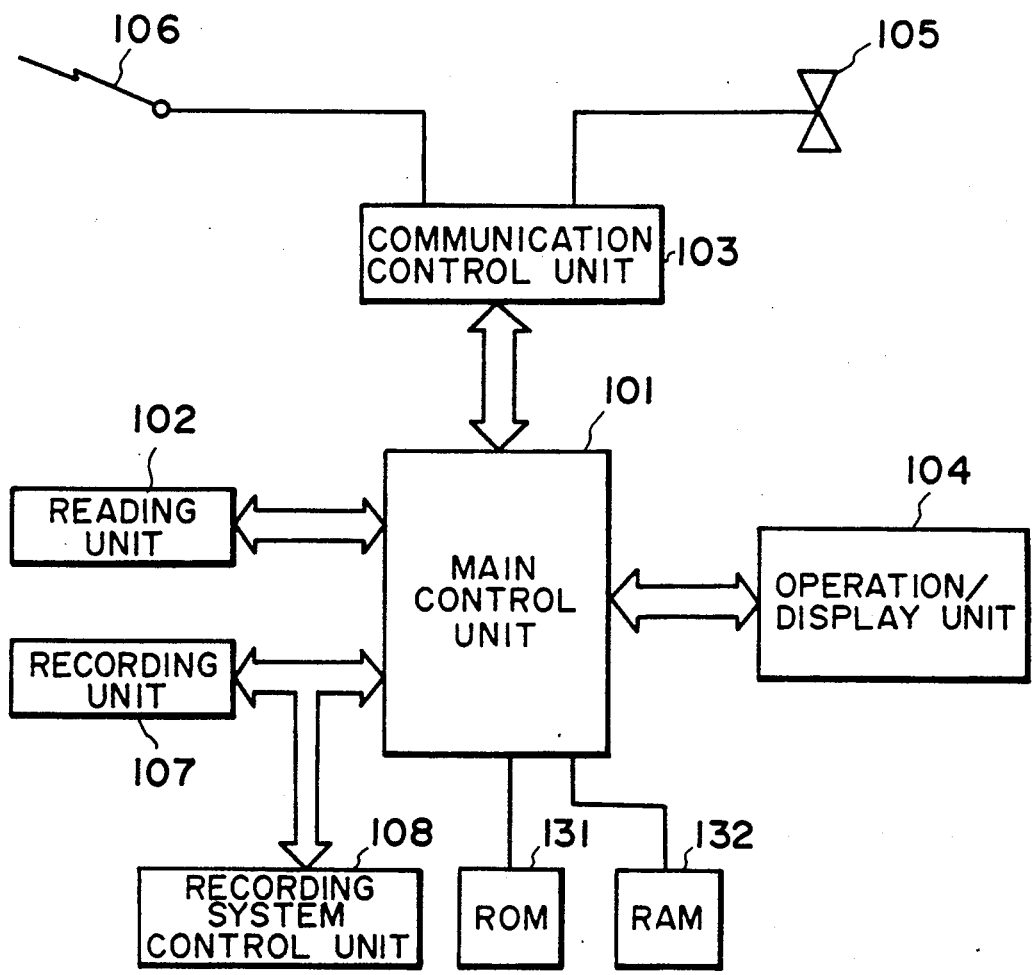
FIG. 14 is a block diagram of an image communication apparatus constituting a third preferred embodiment of the present invention.

FIG. 14 illustrates in block form a double-roll type of facsimile device to which the third preferred embodiment is applied and in which the sizes of recording sheets are automatically changed.

As shown in FIG. 14, a main control unit 101 is constituted by a microprocessor and a memory, and controls the entire operation of the device. The main control unit 101 are provided with a ROM 131 and a RAM 132 for storing a control program and various variables. A readout section 102 is constituted by an image sensor and other related components for reading an image from an original. A communication control unit 103 is constituted by a modem for effecting the modulation and demodulation of received signals and signals to be transmitted, an NCU (network control unit) for switching communication lines and maintaining a loop, and other related components. The communication control unit 103 is connected to a communication line 106, such as a telephone line, and a telephone 105 which is used for controlling the communication line or for holding telephone conversations. A display/operating portion 104 includes a keyboard having a ten-key pad, LCDs, LEDs, and other related components for controlling the operation of the device. A recording portion 107 is constituted by a thermosensitive printer, and its recording operation is controlled by a recording system control unit 108 constituted by a peripheral CPU of a type different from that of the main control unit 101, and other related components.

Figure 15:
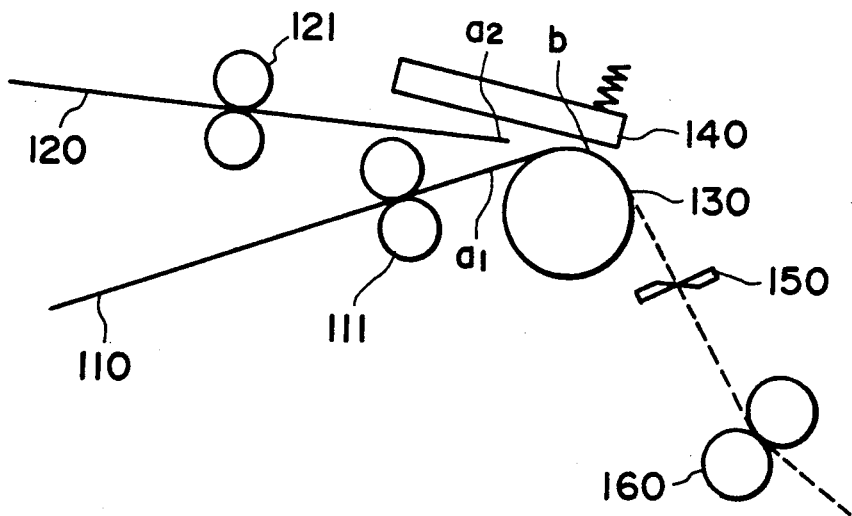
FIG. 15 is a schematic illustration of the recording section of the apparatus shown in FIG. 14.

FIG. 15 is a schematic illustration of the construction of the recording portion 107 shown in FIG. 14. In FIG. 15, by way of example, a recording sheet 110 has an A4-size width while a recording sheet 120 has an A3-size width. Feed rollers 111 are arranged to feed the leading edge of the recording sheet 110 backward and forward between a ready position a1 and a recording position b while feed rollers 112 are arranged to feed the leading edge of the recording sheet 120 backward and forward between a ready position a2 and the print position b.

One of the recording sheets 110 and 120 is selectively fed toward the platen roller 130 by the feed rollers 111 or 121, and is subjected to recording at the recording position b on the platen roller 130 by the thermal head 140. The thus-recorded portion of the recording sheet is fed through a cutter 150 toward discharge rollers 160.

The recording system control unit 108 selectively drives the feed rollers 111, 112 and the platen roller 130 in accordance with a command given by the main control unit 101 to select one of the recording sheets 110 and 120. Simultaneously, the recording system communicates the state of operation to the main control unit 101.

The above-described construction is substantially the same as that of a known type of facsimile device. In the third embodiment, however, the change of the recording sheets is not controlled prior to the reception of an image, that is, before the communicating conditions are determined. The control of such sheet change is performed during a period from a determination of the communication mode including the conditions such as the size of an image transmitted from a remote station to a decision on the image communication conditions.

In the binary coded signaling for facsimile procedure (hereinafter referred to simply as "binary procedure") of the G3 mode, such a period is, for example, the period starting with the reception of a DCS signal, passing through the determination based on the DCS signal of the size of an image to be received, the reception of training and TCF signals, and terminating with the transmission of a CFR signal after completion of training.

In the tonal signaling for facsimile procedure (hereinafter referred to simply as "tonal procedure") of the G2 mode, such a period is, for example, the period starting with the determination of the G2 mode responsive to a GC2 signal, i.e., the time at which the size of an image to be transmitted is identified as A4 size, and terminating when phasing responsive to a phasing signal is completed.

The above-described communication procedures will be described in detail below. First of all, one illustrative example of the binary procedure is described.

In the binary procedure, when a receiver of the facsimile device receives a call, the receiver transmits a DIS signal to a transmitter of the facsimile device to give notice of usable communication conditions required. This signal declares the maximum allowable recording width of the device on the reception side.

In response to this declaration, the transmitter transmits a DCS signal which declares the size of an image to be transmitted. The receiver responds to this signal to determine the size of a recording sheet to be used.

Figure 16:
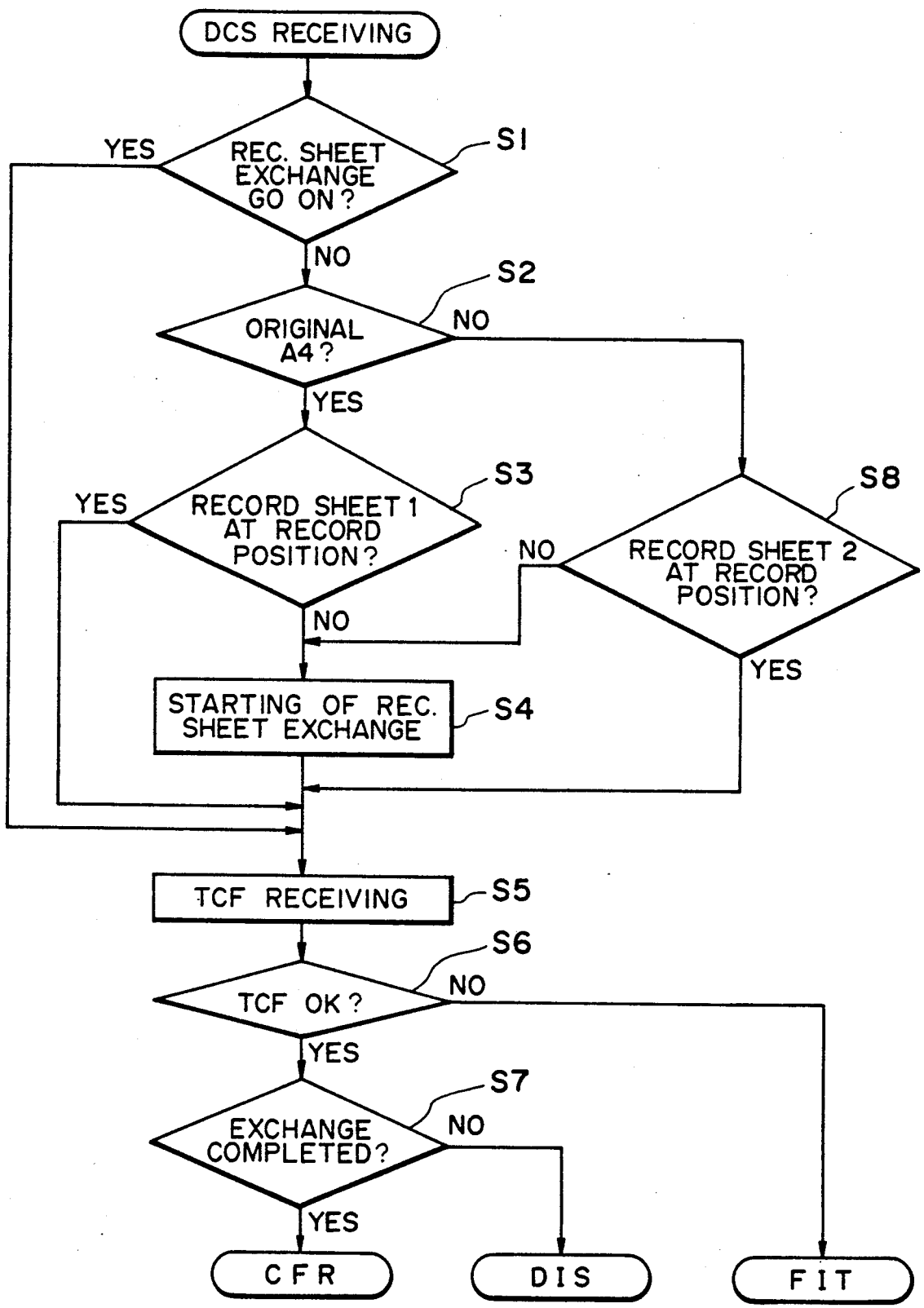
FIG. 16 is a flow chart of one example of the procedure of sheet change which is performed in the third embodiment.

FIG. 16 illustrates in block form the sequence of the process performed by the main control unit 101 after the DCS signal has been received in the binary procedure.

When the DCS signal is received, one of the leading edges of the recording sheets 110 and 120 is normally located at the ready position al or a2 while the other is located at the recording position b. Which of the recording sheets 110 and 120 is located at either of the positions depends upon which of the recording sheets was used in the last image recording. This state is identical to the ready state.

When a DCS signal is received, the main control unit 101 makes judgment (Step S1) as to whether or not an operation of changing the recording sheets is being performed. This judgment is made by monitoring a signal output from the recording system control unit 108. If a first page is not received, the sheet changing operation is not yet performed. Therefore, the process proceeds to Step S2. If the sheet changing operation is previously performed, the process proceeds to Step S5.

In Step S2, judgment is made as to the width of an original to be received in accordance with the specification of the DCS signal. In the case of A4 size, in order to effect recording on the recording sheet 110, the procces proceeds to Step S3, in which judgment is made as to whether or not a desired recording sheet is located at the recording position b on the basis of information in the recording system control unit. In the case of B4 or A3 size, in order to effect recording on the recording sheet 120, the process proceeds to Step S8, in which judgment is made in the same manner as described above.

Where the desired recording sheet is located at the recording position b, the process proceeds to Step S5, in which a TCF signal is received. Where the desired recording sheet is not located at the recording position b, the process proceeds to Step S4, in which a command indicative of sheet change is given to the recording system control unit 8. Subsequently, the process proceeds to Step S5.

When the recording system control unit 108 receives a command indicative of sheet change from the main control section 101, the recording sheet which is located at the recording position b is first moved back until its leading edge reaches the ready position al or a2. Then the leading edge of the other recording sheet is fed from its ready position to the recording position b.

This operation is performed by the recording system control unit 108 in parallel relation to the reception of the TCF signal by the main control unit 101. During this operation, a signal representative of this state is supplied to the main control unit 1.

When the reception of the TCF signal is completed, the process proceeds to Step S6, in which judgment is made as to the result of reception of the TCF signal. If a failure is detected, an FTT signal (representative of a failure in training) is transmitted so that a fall back mode may be selected to reduce the transmission speed.

If no failure is detected, the process proceeds to Step S7, in which judgment is made as to whether or not the recording system control unit 108 completes the sheet changing operation. If the operation is completed, a CFR signal is transmitted, and the process proceeds to the reception of the image.

If the sheet changing operation is not completed, a DIS signal is again transmitted to request that a DCS signal be again transmitted. In a case where the DCS signal is again received, the process proceeds through a predetermined flow chart (not shown) to Step S1, in which judgment is made as to whether or not the sheet changing operation is being performed. If the sheet changing operation is not performed, the process again proceeds to Step S2, and the following Steps are repeated. If the sheet changing operation is being performed, the process proceeds to Step S5, in which a TCF signal is received.

The following operation is similar to that of an ordinary type of facsimile device employing a heat-sensitive sheet roll. Specifically, after an image has been received, the sheet used is fed to the position of the cutter 150, and the recorded portion is cut from the recording sheet. Subsequently, the recording sheet is moved back to the recording position b and is held in a ready state at that position.

If the sheet changing operation is not completed, in order to request the re-transmission of a DCS signal, a CRP signal (representative of a request for command repeat) may be transmitted instead of a DIS signal.

In accordance with such a procedure, it is possible to perform the process for changing the recording sheets, not prior to the reception of an image, but on the basis of a timing which allows the timing of starting the reception of an image to be postponed by the predetermined procedure intentionally repeated by the operator on the reception side. Specifically, if the sheet changing operation is not completed until a response is made to a procedure signal such as a TCF signal, sufficient time can be allocated for performing the sheet changing operation by repeating the predetermined procedure.

Accordingly, even if the speed of sheet change of the recording apparatus is low, it is possible to positively effect the reception and recording of an image, employing a suitable recording sheet.

Figure 17:
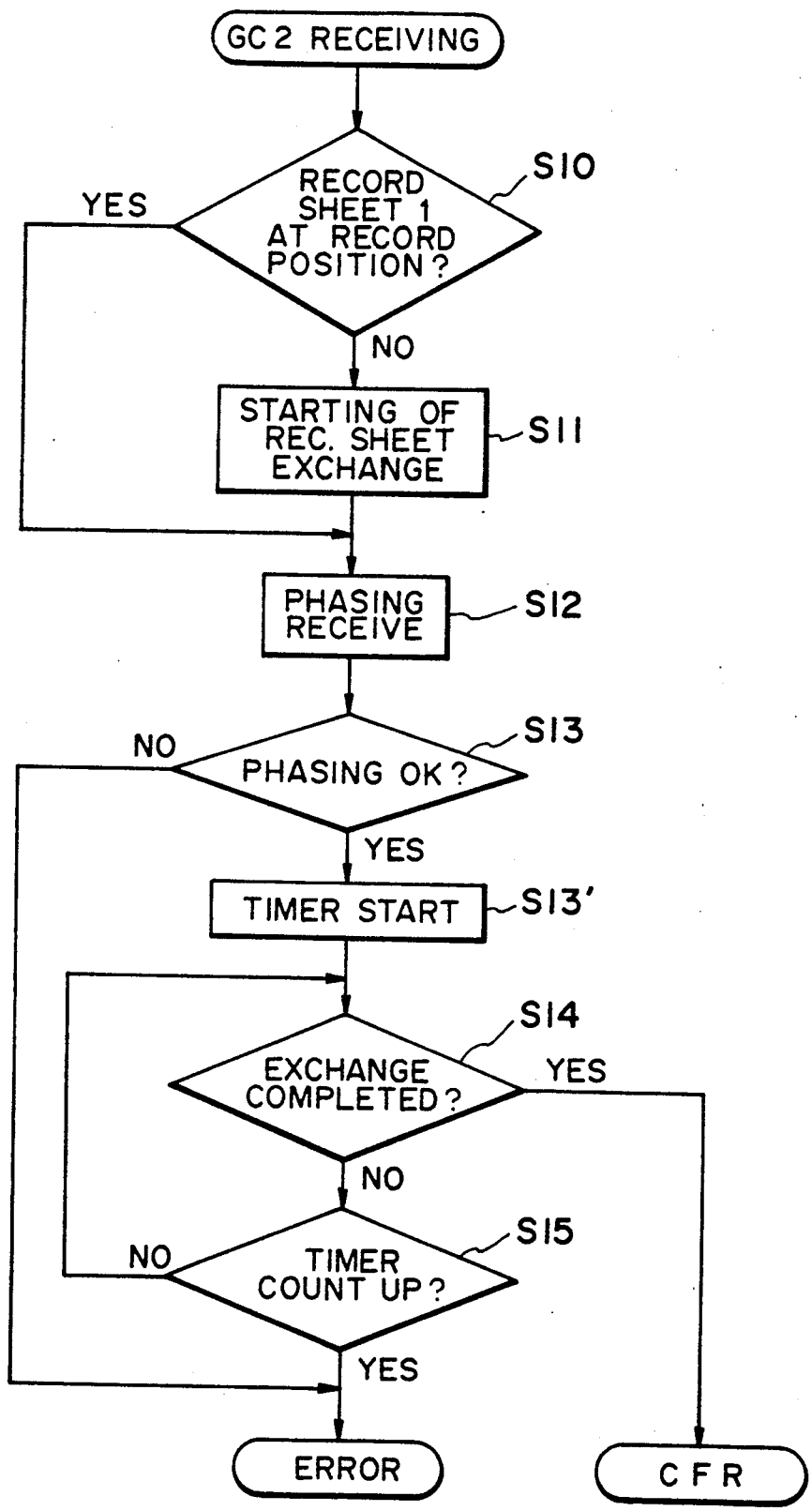
FIG. 17 is a flow chart of another example of the procedure of sheet change which is performed in the third embodiment.

If the tonal procedure is selected, the process sequence shown in FIG. 17 is employed.

In the case of the tonal procedure, the recording sheets are changed while, instead of a TCF signal, a phasing signal for phase synchronization is being received. The DCS signal in the binary procedure of FIG. 16 corresponds to a GC2 signal in the tonal procedure. FIG. 17 illustrates in block form a process sequence following the reception of the GC2 signal.

When the transmission of an A4 original is discriminated by receiving a GC signal from a remote station (an A4-size only is normally transmitted in the G2 mode), the main control unit 101 makes judgment in Step 10 as to whether or not an A4-size recording sheet is located at the recording position b, in the same manner as in the above-described Steps S3 and S8 of FIG. 16.

If the recording sheets need to be changed, the process proceeds to Step S11, in which the sheet changing operation is started. If no sheet change is needed, the process jumps to Step S12, in which a phasing signal is received.

In Step 13, judgment is made as to the result of reception of a phasing signal. If phasing succeeds, the process proceeds to Step S13'. If phasing fails, the process is terminated as error.

In Step 13', in order to set the time until a CFR signal is sent back, a timer with a period of several milliseconds is started The timer may be constituted by a hardware device or a microprocessor provided with software.

In Step 14, judgment is made as to whether the sheet changing operation has been completed. If the sheet changing operation is completed, a CFR signal is transmitted, and the process proceeds to the reception of the image.

If the sheet changing operation is not yet completed, the process proceeds to Step 15, in which judgment is made as to the time counted up by the timer started in Step S13' to determine whether the predetermined time which it takes until a CFR signal is sent back has passed. If the timer does not yet count up, the process returns to Step S14, in which the program waits for the termination of the sheet changing operation. If the timer counts up, the process terminates as error.

In accordance with such a control procedure, effects equivalent to those of the binary procedure can be achieved in the tonal procedure. In the above-described procedure of FIG. 17, the counting operation of the timer is utilized to gain the longest possible time until the arrival of the timing at which a CFR timing should be sent back.

In accordance with such a procedure, it is possible to attain the longest possible time in the tonal procedure of G2 mode in which the repeat of the process is impossible. However, it takes at least six seconds to transmit a phasing signal in the G2 mode. Accordingly, in practice, the operation of changing recording sheets can be carried out without any problem in recording apparatus of any type as long as no jamming occurs. Therefore, it is considered that, in the control procedure shown in FIG. 17, the process substantially proceeds from Step 14 to the transmission of a CFR signal.

In the G3 mode, the time allocated for the transmission of a training signal and a TCF signal is even shorter than that of the G2 mode. However, as described previously, if the sheet changing operation is not completed, the sheet changing procedure is repeated on the basis of GIS and DCS signals. Accordingly, it is possible to allocate sufficient time for sheet changing operation.

It is to be noted that the above-described construction can be applied to not only facsimile devices but also various kinds of image communication apparatus.

As described above, the third preferred embodiment is provided with a plurality of recording sheets of different sizes. When image data is received, one of the recording sheets is selected and fed to the recording section to effect the recording of the received image data. The third embodiment includes control means for controlling the recording apparatus to change the sizes of the recording sheets, if necessary, during a predetermined period in a communication sequence from a determination of the size of the image received from a remote station to a final decision on the communication conditions required. Accordingly, it is possible to allocate sufficient time for a sheet changing operation. Therefore, the sheet changing operation can be performed even in recording apparatus of the type which changes recording sheets at a low speed. In addition, it is possible to provide a unique image communication apparatus which allows the recording sheets to be changed easily, inexpensively and positively, without the need to employ an expensive high-speed recording unit or image memory.

As will be fully understood from the above description of the respective embodiments, the present invention provides a method of efficiently recording an image without causing any unnecessary motion of a plurality of long recording and an apparatus for carrying out that method.

We claim:

1. A method of recording an image based on received image information while a plurality of long recording sheets are selectively fed to a recording section, comprising the steps of:

specifying a desired one of the plurality of recording sheets; and holding the lead edge of the desired, one, after image recording by one communication unit at a position which is downstream with respect to a recording position of the recording section in the direction in which the recording sheet is fed.

2. The method according to claim 1, further comprising the step of specifying the most frequently used one of the plurality of recording sheets.

3. The method for receiving image information and recording an image in response to received image information comprising the steps of selecting one of a first sheet held by first holding means and a second sheet held by second holding means, and locating and maintaining one of the first and second sheets between a platen and a recording head in a waiting state after completion of image recording by one communication unit.

4. A method according to claim 3, further comprising the step of holding the more frequently used sheet between said platen and said recording head.

5. A method for receiving image information and recording an image in response to received image information, while a recording sheet unwound from one sheet roll is being fed to a recording section, recording an image corresponding to image information being effected on one of the recording sheets of first and second sheet rolls in said recording section in response to a predetermined signal, in which if said two rolls have the same width, after image recording by one communication unit is completed, the leading edge of one of said recording sheets is maintained in a ready state at an upstream position of said recording section while the leading edge of another recording sheet is maintained in a ready at a position which is downstream with respect to a recording position in said recording section.

6. An apparatus for receiving image information and recording an image in response to received image information, said apparatus having a recording section, and in which a recording sheet unwound from one of first and second sheet rolls is fed to said recording section including a recording head to record an image onto the recording sheet in accordance with image information, and a platen, said apparatus comprising an arrangement in which one of the first and second recording sheets is set between said recording head and said platen in said recording section, after image recording by one communication unit onto the recording sheet is completed.

7. An apparatus for receiving image information and recording an image in response to received image information, said apparatus having a recording section, and in which a recording sheet unwound from one of first and second sheet rolls is fed to said recording section including a recording head to record an image onto the recording sheet in accordance with image information, said apparatus comprising an arrangement in which one of the first and second sheets is set to a predetermined position in said recording section, wherein said recording section further includes a platen in which the last one of the first and second recording sheets that is subjected to recording is set between said platen and said recording head after recording by one communication unit onto the recording sheet is completed.

8. An apparatus for recording an image, having a recording section, and in which a recording sheet unwound from one of first and second sheet rolls is fed to said recording section including a recording head to record an image onto the recording sheet in accordance with image information, said apparatus comprising an arrangement in which one of the first and second recording sheets is set to a predetermined position in said recording section, wherein said recording section further includes a platen in which the more frequently used one of the first and second recording sheets that is subjected to recording is set between said platen and said recording head after recording onto the recording sheet is completed.

9. An apparatus for recording an image based on received image information, having a recording section, and in which a recording sheet unwound from one of first and second different-sized sheet rolls is fed to said recording section including a recording head to record an image onto the recording sheet in accordance with image information, said apparatus comprising an arrangement in which one of the first and second sheets is set to a predetermined position in said recording section, wherein said recording section further includes a platen in which a desired one of the first and second recording sheets that is subjected to recording is set between said platen and said recording head after recording by one communication unit onto the recording sheet is completed.

10. An image communicating apparatus comprising:
first holding means for holding a first sheet;
second holding means for holding a second sheet having a size different from the first sheet;
recording means for recording received image information onto the sheet disposed at a predetermined recording position;
first conveying means for conveying the first sheet to said recording position;
second conveying means for conveying the second sheet to said recording position; and
control means for controlling said first and second conveying means in such a manner that one of the first and second sheets disposed at said recording position is replaced with another one of the sheets in response to received image information while receiving information for determining communication conditions.

11. An image communicating apparatus according to claim 10, wherein the first and second sheets are roll-like recording sheets.

12. An image communicating apparatus according to claim 10, wherein said first and second conveying means return the first and second sheets from said recording position.

13. An image communicating apparatus according to claim 10, wherein said control means has a first control section for determining communication conditions and a second control section for controlling said first and second conveying means.

14. An image communicating apparatus according to claim 13, wherein said first control section determines whether the sheet disposed at said recording position is a sheet onto which recording occurs in accordance with received image information.

15. An image communicating apparatus according to claim 14, wherein said first control section commands said second control section to exchange the sheet when no sheets to be recorded are at said recording position.

16. An apparatus for receiving image information and recording an image in response to received image information, said apparatus comprising:
a first sheet loading portion capable of loading a first recording sheet thereon;
a second sheet loading portion capable of loading a second recording sheet thereon;
a platen;
a recording head provided facing said platen, for recording the image onto the first recording sheet and the second recording sheet; and
control means for controlling in such a manner that after image recording by one communicating unit is completed either of the first and second recording sheets is located and held between said platen and said recording head for recording.

17. A recording apparatus according to claim 16, wherein the first recording sheet and the second recording sheet are each a respective roll-like recording sheet.

18. A recording apparatus according to claim 16, wherein said recording apparatus is a facsimile machine having an original image reading mechanism and an image recording mechanism.

19. A recording apparatus according to claim 16, wherein said platen has a roller rotatable in forward and reverse directions selectively, and wherein the first recording sheet and the second recording sheet are supplied by forward rotation of said roller, and are returned by reverse rotation of said roller.

20. A recording apparatus according to claim 16, further comprising a sensor for detecting a width of the first recording sheet loaded on said first sheet loading portion.

21. A recording apparatus according to claim 16, further comprising a sensor for detecting a width of the second recording sheet loaded on said second sheet loading portion.

22. A recording apparatus according to claim 16, further comprising cutter means for cutting the first recording sheet and the second recording sheet.

23. A recording apparatus according to claim 16, further comprising cutter means, provided downstream of said recording head with respect to a direction in which the recording sheets are conveyed to a recording position, for cutting the recording sheets, and manual cutting means for cutting the first recording sheet using said cutter means so as to align a leading end when the first recording sheet is loaded on said first sheet loading portion.

24. A recording apparatus according to claim 16, further comprising cutter means, provided downstream of said recording head with respect to a direction in which the recording sheets are conveyed to a recording position for cutting the recording sheet and manual cutting means, for cutting the second recording sheet using said cutter means so as to align a leading end when the second recording sheet is loaded on said second sheet loading portion.

25. A recording apparatus according to claim 16, wherein said platen has a roller rotatable in forward and reverse directions selectively and said apparatus further comprises a pair of rollers rotatable in forward and reverse directions selectively and provided upstream of said roller with respect to a direction in which the first recording sheet is conveyed to a recording position, for conveying the first recording sheet in forward and reverse directions selectively.

26. A recording apparatus according to claim 16, wherein said platen has a roller rotatable in forward and reverse directions selectively and said apparatus further comprises a pair of rollers rotatable in forward and reverse directions selectively and provided upstream of said roller with respect to a direction in which the second recording sheet is conveyed to a recording position, for conveying the second recording sheet in forward and reverse directions selectively.

27. A recording apparatus according to claim 16, wherein a main body of said apparatus comprises a first housing and a second housing which are openable with respect to each other, and said apparatus further comprises a first and second pair of feed rollers, wherein said first housing houses said first sheet loading portion, said second sheet loading portion, said platen and said first pair of feed rollers for conveying the first recording sheet loaded on said first sheet loading portion, and wherein said second housing houses said recording head and said second pair of feed rollers for conveying the second recording sheet loaded on said second sheet loading portion.

28. An image communicating apparatus comprising:
first holding means for holding a first sheet;
second holding means for holding a second sheet;
recording means for recording received image information onto the sheet disposed at a predetermined recording position;
conveying means for conveying the first and second sheets to said recording position; and
control means for controlling said conveying means in such a manner that after image recording by one communication unit is completed, the leading edge of one of said first and second recording sheets is maintained in a ready state at a downstream position of said recording position while the leading edge of another recording sheet is maintained in a ready state at a position upstream of said recording position.

29. An image communicating apparatus according to claim 28, wherein the first and second sheets are roll-like recording sheets.

30. An image communicating apparatus according to claim 28, wherein said conveying means returns the first and second sheets from said recording position.

31. An image communicating apparatus according to claim 28, wherein said first holding means has a sensor for detecting the width of the first sheet.

32. An image communicating apparatus according to claim 28, wherein said second holding means has a sensor for detecting the width of the second sheet.

33. An image communicating apparatus according to claim 28, further comprising a cutting means for cutting the first and second sheets.

34. An image communicating apparatus according to claim 30, wherein said conveying means has a first rotary member for conveying the first sheet in forward and reverse directions and a second rotary member for conveying the second sheet in forward and reverse directions.

* * * * *

UNITED STATES PATENT AND TRADEMARK OFFICE
CERTIFICATE OF CORRECTION

PATENT NO. : 5,017,945
DATED : May 21, 1991
INVENTOR(S) : KEIZO SASAI, ET AL.

It is certified that error appears in the above-identified patent and that said Letters Patent is hereby corrected as shown below:

SHEET 13 OF 17

FIG. 12, "CONYEYING" (both occurrences) should read --CONVEYING--.

COLUMN 2

Line 8, "does" should read --does not--.
Line 23, "respect" should read --aspect--.
Line 54, "recoding" should read --recording--.

COLUMN 3

Line 8, "5A and" should read --5A, 5B and--.
Line 26, "embodiments" should read --embodiment--.
Line 29, "embodiments" should read --embodiment--.

COLUMN 6

Line 48, "sensors 13b" should read --sensor 13b--.

COLUMN 8

Line 18, "A4-size" should read --when A4-size--.
Line 34, "operator to" should be deleted.
Line 35, "initialize the position of the leading edges of the" should be deleted.
Line 38, "16b" should read --16a--.

COLUMN 9

Line 5, "sheet" should read --sheets--.

UNITED STATES PATENT AND TRADEMARK OFFICE
CERTIFICATE OF CORRECTION

PATENT NO. : 5,017,945
DATED : May 21, 1991
INVENTOR(S) : KEIZO SASAI, ET AL.

It is certified that error appears in the above-identified patent and that said Letters Patent is hereby corrected as shown below:

COLUMN 9

Line 16, "Step 5" should read --Step S5--.
    Line 21, "Step 5" should read --Step S5--.
    Line 32, "Step 9," should read --Step S9,--.
    Line 40, "Step 8," should read --Step S8,--.
    Line 41, "Step 18 and 19" should read --Steps S18 and S19--.
    Line 43, "Step 17," should read --Step S17,-- and
           "Step 18" should read --Step S18--.
    Line 47, "Step 10" should read --Step S10--.
    Line 52, "Step 20," should read --Step S20,--.
    Line 55, "Step 18" should read --Step S18--.
    Line 58, "Step 20," should read --Step S20,--.

COLUMN 11

Line 47, "sheet" should read --sheets--.

COLUMN 12

Line 4, "sheet 4a" should read --sheet 4--.
    Line 8, "sheet 5a" should read --sheet 5--.
    Line 22, "A4-size" should read --A3-size--.

COLUMN 13

Line 37, "A-size" should read --A4-size--.
    Line 56, "respectively" should read --respectively.--.

UNITED STATES PATENT AND TRADEMARK OFFICE
CERTIFICATE OF CORRECTION

PATENT NO. : 5,017,945

DATED : May 21, 1991

INVENTOR(S) : KEIZO SASAI, ET AL.

Page 3 of 4

It is certified that error appears in the above-identified patent and that said Letters Patent is hereby corrected as shown below:

COLUMN 14

Line 4, "rotates" should read --rotates.--.
Line 39, "to" should be deleted.

COLUMN 15

Line 66, "are" should read --is--.

COLUMN 16

Line 32, "rollers 111" should read --roller 111--.
Line 33, "or 121," should read --or 112,--.

COLUMN 17

Line 41, "procces" should read --process--.
Line 55, "unit 8." should read --unit 108.--.
Line 68, "unit 1." should read --unit 101.--.

COLUMN 19

Line 6, "Step 13" should read --Step S13--.
Line 10, "Step 13'" should read --Step S13'--.
Line 12, "started" should read --started.--.
Line 15, "Step 14" should read --Step S14--.
Line 21, "Step 15" should read --Step S15--.
Line 52, "GIS" should read --DIS--.

UNITED STATES PATENT AND TRADEMARK OFFICE
CERTIFICATE OF CORRECTION

PATENT NO. : 5,017,945
DATED : May 21, 1991
INVENTOR(S) : KEIZO SASAI, ET AL.

It is certified that error appears in the above-identified patent and that said Letters Patent is hereby corrected as shown below:

COLUMN 20

Line 23, "desired," should read --desired--.
　　Line 31, "The" should read --A--.
　　Line 57, "ready" should read --ready state--

Signed and Sealed this

Third Day of August, 1993

Attest:

MICHAEL K. KIRK

*Attesting Officer*　　　*Acting Commissioner of Patents and Trademarks*